(12) United States Patent
Uchino et al.

(10) Patent No.: US 6,288,921 B1
(45) Date of Patent: Sep. 11, 2001

(54) CONTROL APPARATUS FOR POWER CONVERTER

(75) Inventors: Hiroshi Uchino; Ryuichi Morikawa, both of Tokyo; Kiyoshi Kusunoki, Kanagawa-ken; Takeo Kanai, Saitama-ken; Tadashi Nishikawa, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/639,882

(22) Filed: Aug. 17, 2000

(30) Foreign Application Priority Data

Sep. 1, 1999 (JP) .................................................. 11-247133

(51) Int. Cl.[7] ..................... H02M 7/5387; H02M 7/521; H02M 5/42
(52) U.S. Cl. ............................. 363/132; 363/137; 363/98
(58) Field of Search ................................ 363/132, 134, 363/131, 137, 135, 136, 95, 98, 17, 55, 58, 57

(56) References Cited

U.S. PATENT DOCUMENTS

| | | | | |
|---|---|---|---|---|
| 3,622,863 | * | 11/1971 | King ........................................ | 363/135 |
| 4,052,657 | * | 10/1977 | Kleiner et al. ............................ | 363/43 |
| 4,545,002 | * | 10/1985 | Walker ..................................... | 363/37 |
| 4,942,511 | * | 7/1990 | Lipo et al. ................................ | 363/136 |
| 5,450,306 | * | 9/1995 | Garces et al. ............................. | 363/58 |
| 5,621,628 | * | 4/1997 | Miyazaki et al. ......................... | 363/37 |
| 5,852,558 | * | 12/1998 | Julian et al. .............................. | 363/132 |
| 6,031,738 | * | 2/2000 | Lipo et al. ................................ | 363/37 |

* cited by examiner

Primary Examiner—Peter S. Wong
Assistant Examiner—Bao Q. Vu
(74) Attorney, Agent, or Firm—Foley & Lardner

(57) ABSTRACT

A control apparatus for a power converter having a plurality of semiconductor switching devices that converts DC power into AC power and outputs three levels of voltages, including a command voltage generator configured to output a command voltage vector that represents a voltage to be output from the power converter, an integrator configured to calculate a difference integral vector by integrating a difference between the command voltage vector and an output voltage vector that represents a voltage command for the power converter, a difference vector calculator configured to calculate difference vectors by subtracting the command voltage vector from each of the possible output voltage vectors, a vector selector configured to select one of the possible output voltage vectors which corresponds to one of the difference vectors making the largest angle with the difference integral vector as the output voltage vector only if the difference integral vector exceeds a predetermined value, and a gate signal generator configured to determine one of switching states that includes a plurality of ON-OFF pattern signals for turning on and off the semiconductor switching devices on the basis of the output voltage vector.

13 Claims, 22 Drawing Sheets

CONTROL APPARATUS FOR POWER CONVERTER

CROSS REFERENCE TO RELATED APPLICATION

This application claims benefit of priority to Japanese Patent Application No. 11-247133 filed Sep. 1, 1999, the entire content of which is incorporated by reference herein.

BACKGROUND OF THE INVENTION

1. Field of the Invention

This invention relates to a control apparatus for a power converter, each phase of the power converter may output three levels of voltages, and more specifically to a control apparatus that may minimize a switching loss of a semiconductor switching device at a time of switching by minimizing the number of turning ON/OFF (switching) of the semiconductor switching device and may control a waveform of output voltage suitably.

2. Description of the Background

FIG. 1 is a circuit diagram showing a main circuit of a power converter that may output three levels of voltages and a conventional control apparatus for the power converter.

In FIG. 1, a converter 1 includes two DC (Direct Current) capacitors 2 and 3, twelve semiconductor switching devices S11, S12, S13, S14, S21, S22, S23, S24, S31, S32, S33 and S34, and diodes. A DC power source 4 is connected to the converter 1. A controller for the converter 1 includes a command voltage generator 5, a carrier wave generator 6, six comparators 7, 8, 9, 10, 11 and 12, and six inverters 13, 14, 15, 16, 17 and 18. G11–G14, G21–G24 and G31–G34 represent gate signals for the semiconductor switching devices S11–S14, S21–S24 and S31–S34 respectively.

FIG. 2 is one example of a waveform that indicates an operation of the controller for the converter 1 in FIG. 1. The operation of each portion of the controller is described referring to FIG. 2.

The command voltage generator 5 generates output voltage commands VU*, VV* and VW* to be output from the converter 1 on the basis of a power or a current flowing in a load connected to AC (Alternating Current) terminals of the converter 1. The carrier wave generator 6 generates two carrier waves VCP and VCN in order to modulate the output voltage commands VU*, VV* and VW*. The carrier wave VCP has the same triangular waveform as the carrier wave VCN. The carrier wave VCP sets the minimum value at 0 (zero), while the carrier wave VCN sets the maximum value at 0 (zero). The comparator 7 compares the output voltage command VU* with the carrier wave VCP, and outputs "1" as the gate signal G11 of the semiconductor switching device S11 and "0" as the gate signal G13 of the semiconductor switching device S13 at the time that the output voltage command VU* is higher than the carrier wave VCP. On the contrary, where the output voltage command VU* is lower than the carrier wave VCP, the gate signal G11 is made "0" and the gate signal G13 is made "1". A gate signal "1" represents a command for turning on the corresponding semiconductor switching device, while a gate signal "0" represents a command for turning off the corresponding semiconductor switching device. The inverter 13 inverts a logic of the gate signal G11 and G13.

Likewise, the comparator 8 and the inverter 14 determine the gate signals G12 and G14 of the semiconductor switching devices S12 and S14 on the basis of the output voltage commands VU* and the carrier wave VCN.

Description of the operation of the other comparators and inverters in FIG. 1 are omitted, because the other comparators and inverters operate in the same way as the comparators 7 and 8, and the inverters 13 and 14.

The corresponding semiconductor switching devices S11–S34 turn on and off in response to the above determined gate signals G11–G34, thereby converting a DC voltage supplied from the DC power source 4 into output voltages based on the output voltage commands VU*, VV* and VW*. The DC capacitors 2 and 3 are used for smoothing and stabilizing an electric power supplied from the DC power source 4.

As described above, the semiconductor switching devices S11–S34 repeatedly turn on and off at a frequency based on the frequency of the carrier waves VCP and VCN, when the converter 1 generates a suitable voltage. As switching frequency of the semiconductor switching device rises, a switching loss caused by turning on and off the semiconductor switching device increases. As a result, power efficiency of the converter 1 lowers and a converting rate of voltage, that is called "utilization factor", is also reduced due to an increase of unnecessary switching.

Imbalance of switching losses among the semiconductor switching devices S11–S34 may occur depending on conditions of an output voltage or an output current of the converter 1, thereby raising a temperature of the only one part of the semiconductor switching devices due to heat loss, and giving rise to a thermal stress. With the advance of the thermal stress, the semiconductor switching devices may break.

In case that a current flows into the DC capacitor through the only semiconductor switching devices S12, S22, S32, S13, S23 and S33 and diodes which are directly connected to the AC terminals of the converter 1, that is, at least one phase of the converter 1 has the same potential as a joint of the DC capacitors 2 and 3 has, directions of currents flowing into the DC capacitors 2 and 3 are different from each other, whereby voltage imbalance between the DC capacitors 2 and 3 may occur. With the advance of the voltage imbalance, an output voltage of the converter 1 may not be controlled suitably, or the main circuit may break because of the excessive increase of voltages of either DC capacitor 2 or 3.

SUMMARY OF THE INVENTION

Accordingly, one object of this invention is to provide a control apparatus for a power converter which may minimize the number of switching of semiconductor switching devices.

Another object of this invention is to provide a control apparatus for a power converter which may balance temperatures of semiconductor switching devices.

Another object of this invention is to provide a control apparatus for a power converter which may balance voltages of the positive side of capacitor and the negative side of capacitor and may control an output voltage of the converter suitably.

The present invention provides a control apparatus for a power converter having a plurality of semiconductor switching devices that converts DC power into AC power and outputs three levels of voltages, including a command voltage generator configured to output a command voltage vector that represents a voltage to be output from the power converter, an integrator configured to calculate a difference integral vector by integrating a difference between the command voltage vector and an output voltage vector that represents a voltage command for the power converter, a difference vector calculator configured to calculate difference vectors by subtracting the command voltage vector from each of the possible output voltage vectors, a vector selector configured to select one of the possible output voltage vectors which corresponds to one of the difference vectors making the largest angle with the difference integral vector as the output voltage vector only if the difference integral vector exceeds a predetermined value, and a gate signal generator configured to determine one of switching states that includes a plurality of ON-OFF pattern signals for turning on and off the semiconductor switching devices on the basis of the output voltage vector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
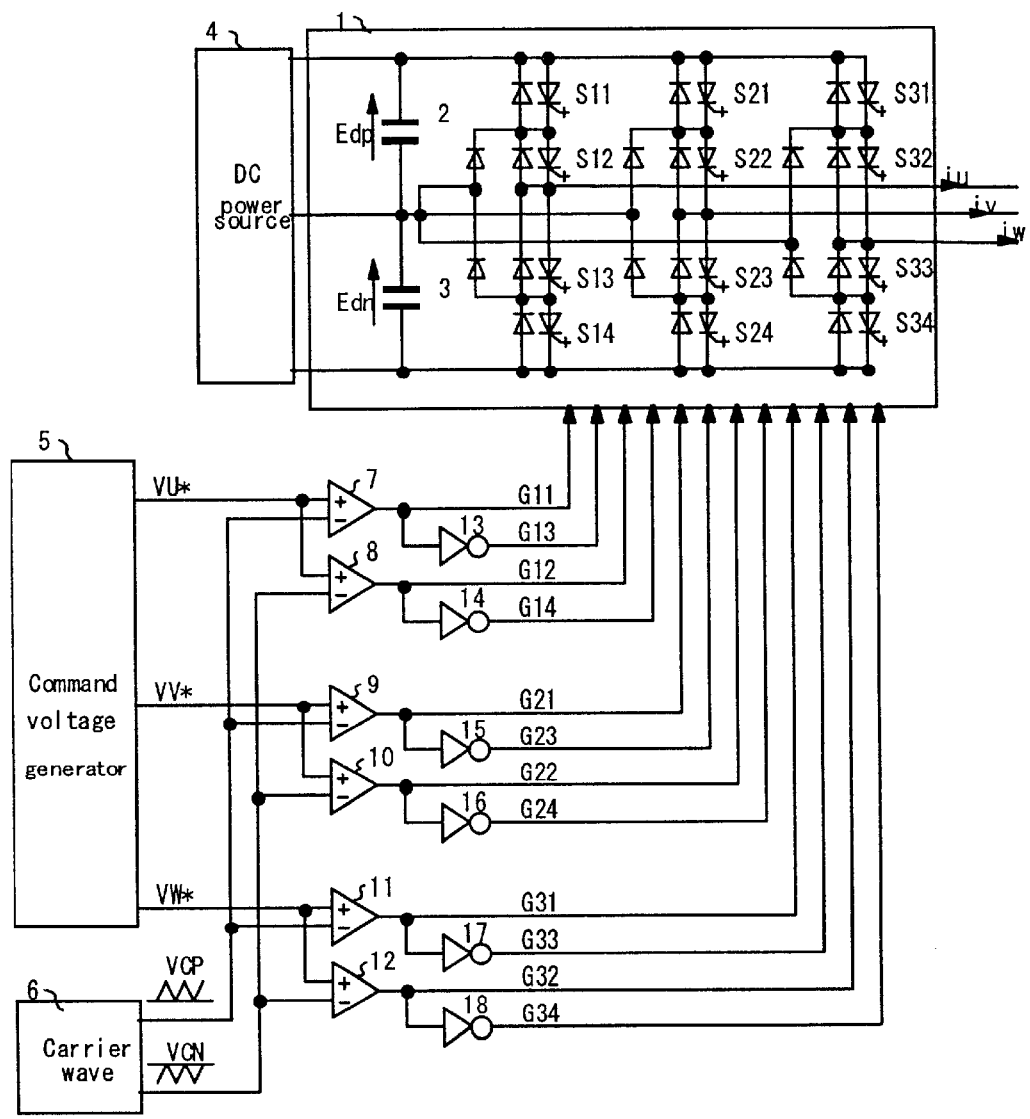
FIG. 1 is a circuit diagram showing a main circuit of a power converter that may output three levels of voltages and a conventional control apparatus for the power converter.
Figure 2:
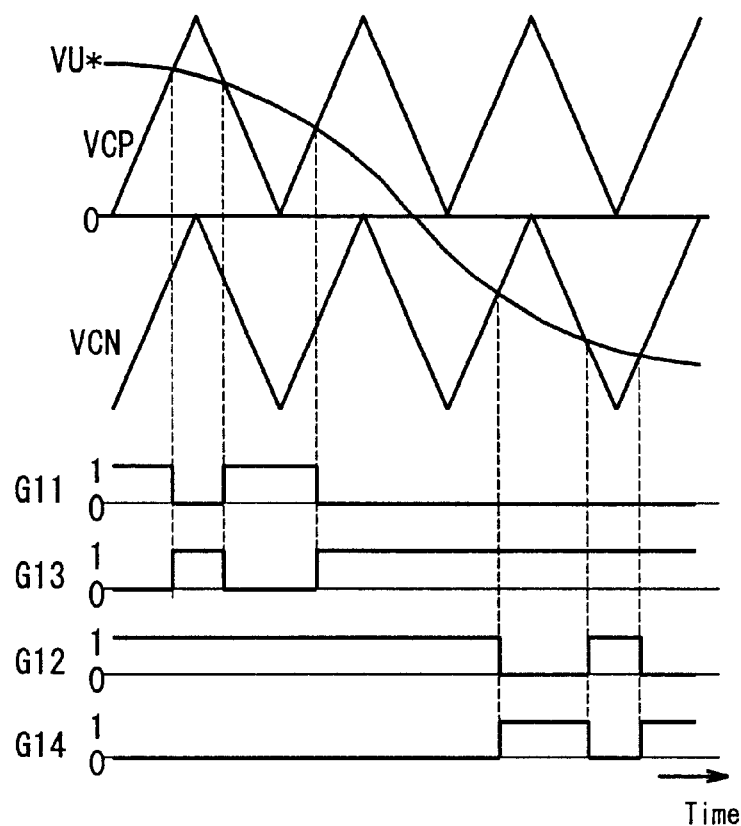
FIG. 2 is one example of a waveform that indicates an operation of the controller for the converter in FIG. 1.

Several embodiments of the present invention are hereinafter described in detail referring drawings. A detail description of the same components as the components in FIG. 1 is omitted by appending the same numerals to the corresponding components.

(First Embodiment)

Figure 3:
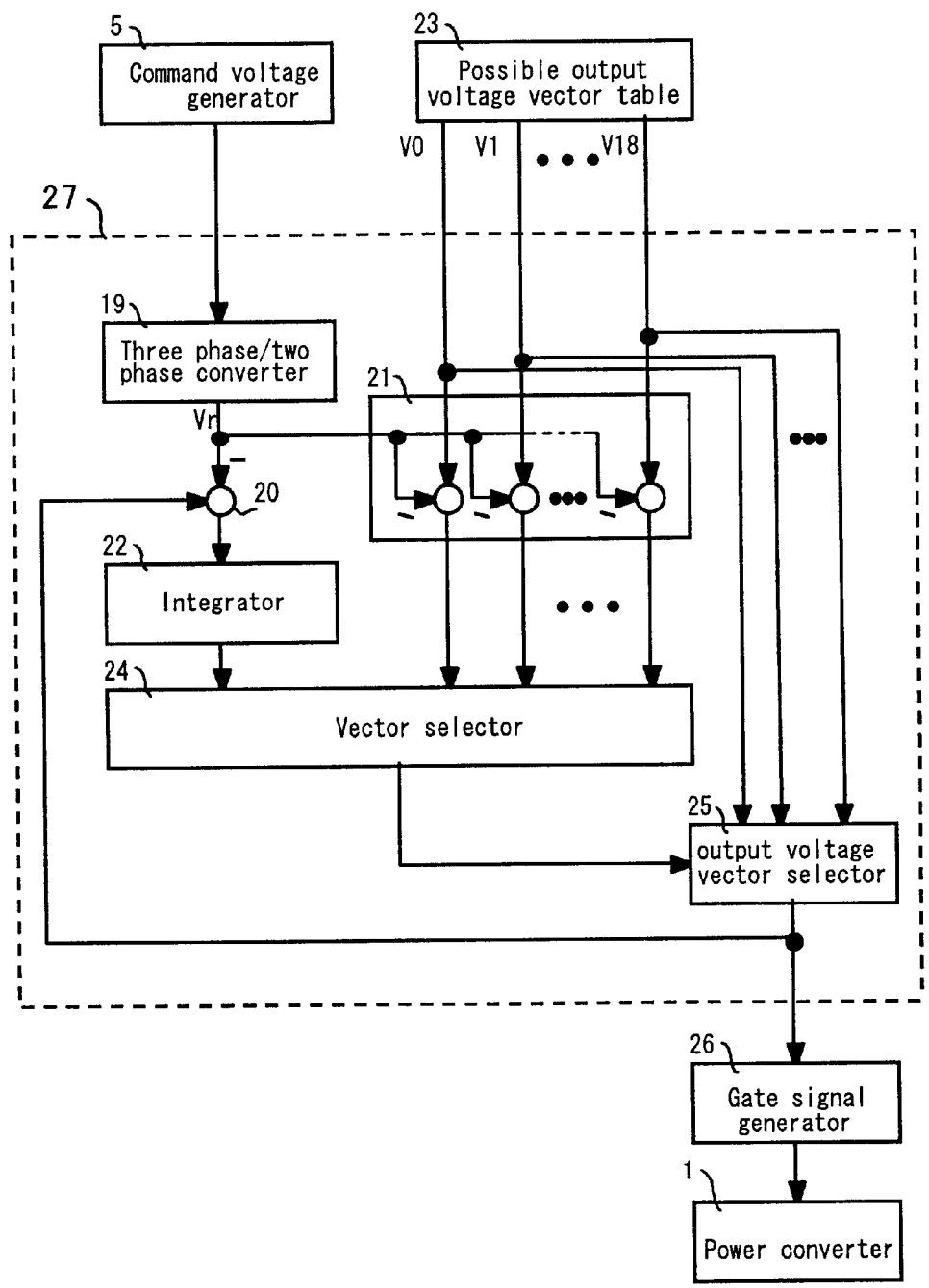
FIG. 3 is a block diagram showing a controller for a power converter of a first embodiment of the present invention.

FIG. 3 is a block diagram showing a controller for a power converter of a first embodiment of the present invention.

In FIG. 3, a three-phase/two-phase converter 19 calculates a command voltage vector Vr by converting a three-phase command voltage generated from a command voltage generator 5 to a two-phase signal.

A possible output voltage vector table 23 functions to output nineteen kinds of possible output voltage vectors V0–V18 that the power converter 1 may output.

An output voltage vector controller 27 determines an output voltage vector Vo on the basis of the possible output voltage vectors V0–V18 and the three-phase command voltage generated from the command voltage generator 5, and outputs the output voltage vector Vo to a gate signal generator 26.

A first difference vector calculator 20 calculates a first difference vector by subtracting the output voltage vector Vo from the command voltage vector Vr, and outputs the first difference vector to an integrator 22.

The integrator 22 calculates a difference integral vector Vi by integrating the first difference vector calculated by the first difference vector calculator 20.

A second difference vector calculator 21 calculates nineteen second difference vectors by subtracting the command voltage vector Vr from each of the possible output voltage vectors V0–V18.

A vector selector 24 calculates angles formed by the difference integral vector Vi and each of the second difference vectors respectively, then selects one of the possible output voltage vectors which corresponds to one of the second difference vectors making the largest angle with the difference integral vector Vi, and outputs an output voltage vector selecting signal corresponding to the selected possible output voltage vector to an output voltage vector selector 25.

The output voltage vector selector 25 selects one of the possible output voltage vectors which corresponds to the output voltage vector selecting signal as the output voltage vector Vo and outputs the output voltage vector Vo to both the first difference vector calculator 20 and the gate signal generator 26.

The gate signal generator 26 generates ON-OFF pattern signals on the basis of the output voltage vector Vo and outputs a switching state of the ON-OFF pattern signals to the power converter 1.

Figure 4:
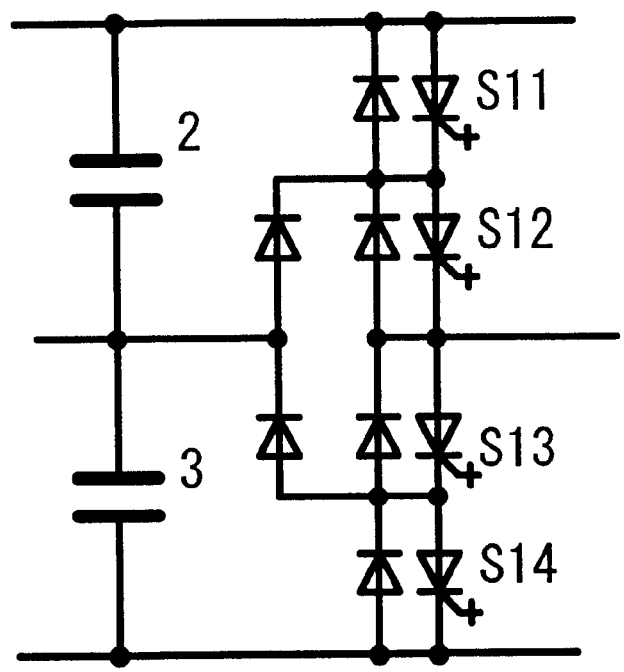
FIG. 4 is a circuit diagram showing only one arm (U-phase) of the power converter in FIG. 1.

An operation of the above-mentioned controller is hereinafter explained referring to FIGS. 3–6. FIG. 4 is a circuit diagram showing only one arm (U-phase) of the power converter 1. There are the following three switching patterns that represent switching states of the semiconductor switching devices S11–S14. In the following table, the symbol "ON" represents ON state of the semiconductor switching devices, and the symbol "OFF" represents OFF state of the semiconductor switching devices.

|  | S11, | S12, | S13, | S14 |
|---|---|---|---|---|
| Pattern 1: | ON, | ON, | OFF, | OFF |
| Pattern 2: | OFF, | ON, | ON, | OFF |
| Pattern 3: | OFF, | OFF, | ON, | ON |

The other semiconductor switching devices S21–S24 consisting of V-phase circuit and S31–S34 (W-phase circuit) turn on and off in the same way as the semiconductor switching devices S11–S14.

Output voltages VU, VV and VW of the power converter 1 in the above three patterns may be expressed in the following table, in case of disregarding voltage drop caused by a wiring or the turn-on semiconductor switching devices. In the following table, output voltages of the DC capacitors 2 and 3 are assumed to be equal to each other, and the output voltages are ED.

Pattern 1: ED
Pattern 2: 0
Pattern 3: −ED

Output voltage indexes IU, IV and IW, which are calculated by dividing the above output voltages by a DC voltage of ED are as follows:

Pattern 1: 1
Pattern 2: 0
Pattern 3: −1

Figure 5:
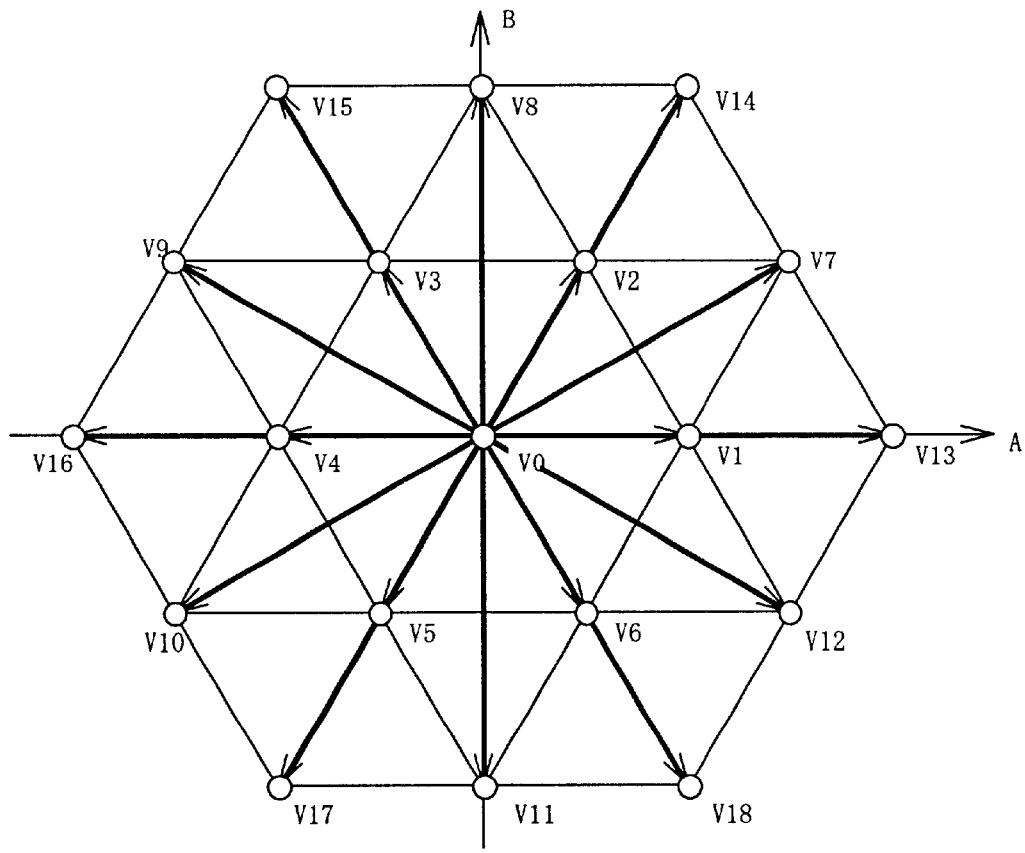
FIG. 5 is a vector diagram showing the possible output voltage vectors V0–V18.

FIG. 5 shows the possible output voltage vectors V0–V18 represented by the output voltage indexes IU, IV and IW by using the following formula 1. In FIG. 5, A-axis represents a U-phase direction and B-axis advances by 90 degrees from the A-axis. Further, in FIG. 5, start points of the possible output voltage vectors V0–V18 are set to the origin of the coordinate axes, and the terminal points of the possible output voltage vectors V0–V18 are represented by points.

$$IU + IV \cdot e^{j\frac{2\pi}{3}} + IW \cdot e^{j\frac{4\pi}{3}} \quad \text{(Formula 1)}$$

There are twenty seven combinations of the output voltage indexes IU, IV and IW. In case of expressing the possible output voltage vectors V0–V18 as shown in FIG. 5, some combinations of the output voltage indexes IU, IV and IW form the same vector to each other. Therefore, nineteen kinds of output voltage vectors, which are the possible output voltage vectors V0–V18, may be output from the power converter 1. A relationship among the possible output voltage vectors V0–V18, the output voltage indexes IU, IV and IW, and switching states of the semiconductor switching devices S11–S34 is as follows:

TABLE 1

|  |  | Switching states of semiconductor devices | | |
|---|---|---|---|---|
|  | IU, IV, IW | S11,S12,S13,S14 | S21,S22,S23,S24 | S31,S32,S33,S34 |
| V0 | 1, 1, 1 | ON, ON, OFF,OFF | ON, ON, OFF,OFF | ON, ON, OFF,OFF |
|  | 0, 0, 0 | OFF,ON, ON, OFF | OFF,ON, ON, OFF | OFF,ON, ON, OFF |
|  | −1,−1,−1 | OFF,OFF,ON, ON | OFF,OFF,ON, ON | OFF,OFF,ON, ON |
| V1 | 0,−1,−1 | OFF,ON, ON, OFF | OFF,OFF,ON, ON | OFF,OFF,ON, ON |
|  | 1, 0, 0 | ON, ON, OFF,OFF | OFF,ON, ON, OFF | OFF,ON, ON, OFF |
| V2 | 0, 0,−1 | OFF,ON, ON, OFF | OFF,ON, ON, OFF | OFF,OFF,ON, ON |
|  | 1, 1, 0 | ON, ON, OFF,OFF | ON, ON, OFF,OFF | OFF,ON, ON, OFF |
| V3 | −1, 0,−1 | OFF,OFF,ON, ON | OFF,ON, ON, OFF | OFF,OFF,ON, ON |
|  | 0, 1, 0 | OFF,ON, ON, OFF | ON, ON, OFF,OFF | OFF,ON, ON, OFF |
| V4 | −1, 0, 0 | OFF,OFF,ON, ON | OFF,ON, ON, OFF | OFF,ON, ON, OFF |
|  | 0, 1, 1 | OFF,ON, ON, OFF | ON, ON, OFF,OFF | ON, ON, OFF,OFF |
| V5 | −1,−1, 0 | OFF,OFF,ON, ON | OFF,OFF,ON, ON | OFF,ON, ON, OFF |
|  | 0, 0, 1 | OFF,ON, ON, OFF | OFF,ON, ON, OFF | ON, ON, OFF,OFF |
| V6 | 0,−1, 0 | OFF,ON, ON, OFF | OFF,OFF,ON, ON | OFF,ON, ON, OFF |
|  | 1, 0, 1 | ON, ON, OFF,OFF | OFF,ON, ON, OFF | ON, ON, OFF,OFF |
| V7 | 1, 0,−1 | ON, ON, OFF,OFF | OFF,ON, ON, OFF | OFF,OFF,ON, ON |
| V8 | 0, 1,−1 | OFF,ON, ON, OFF | ON, ON, OFF,OFF | OFF,OFF,ON, ON |
| V9 | −1, 1, 0 | OFF,OFF,ON, ON | ON, ON, OFF,OFF | OFF,ON, ON, OFF |
| V10 | −1, 0, 1 | OFF,OFF,ON, ON | OFF,ON, ON, OFF | ON, ON, OFF,OFF |
| V11 | 0,−1, 1 | OFF,ON, ON, OFF | OFF,OFF,ON, ON | ON, ON, OFF,OFF |
| V12 | 0,−1, 0 | OFF,ON, ON, OFF | OFF,OFF,ON, ON | OFF,ON, ON, OFF |
| V13 | 1,−1, 0 | ON, ON, OFF,OFF | OFF,OFF,ON, ON | OFF,ON, ON, OFF |
| V14 | 1,−1,−1 | ON, ON, OFF,OFF | OFF,OFF,ON, ON | OFF,OFF,ON, ON |
| V15 | 1, 1,−1 | ON, ON, OFF,OFF | ON, ON, OFF,OFF | OFF,OFF,ON, ON |
| V16 | −1, 1, 1 | OFF,OFF,ON, ON | ON, ON, OFF,OFF | ON, ON, OFF,OFF |
| V17 | −1,−1, 1 | OFF,OFF,ON, ON | OFF,OFF,ON, ON | ON, ON, OFF,OFF |
| V18 | 1,−1, 1 | ON, ON, OFF,OFF | OFF,OFF,ON, ON | ON, ON, OFF,OFF |

The three-phase/two-phase converter 19 converts the three phase command voltages VU*, VV* and VW* generated from the command voltage generator 5 into A-axis component and B-axis component of the command voltage vector Vr by use of the following formulas 2 and 3.

$$VrA = \frac{2}{3}\left(VU^* - \frac{VV^* + VW^*}{2}\right) \quad \text{(Formula 2)}$$

[0040]

$$VrB = \frac{1}{\sqrt{3}}(VV^* - VW^*) \quad \text{(Formula 3)}$$

The first difference vector calculator 20 calculates a first difference vector by subtracting the command voltage vector Vr from the output voltage vector Vo, and then the integrator 22 calculates a difference integral vector Vi by integrating the first difference vector. The respective A-axis component ViA and B-axis component ViB of the difference integral vector Vi are represented by the following formulas 4 and 5. In the formulas 4 and 5, "VoA" and "VoB" represent respective A-axis component and B-axis component of the output voltage vector Vo.

$$ViA = \int (VrA - VoA)dt \quad \text{(Formula 4)}$$

$$ViB = \int (VrB - VoB)dt \quad \text{(Formula 5)}$$

Figure 6:
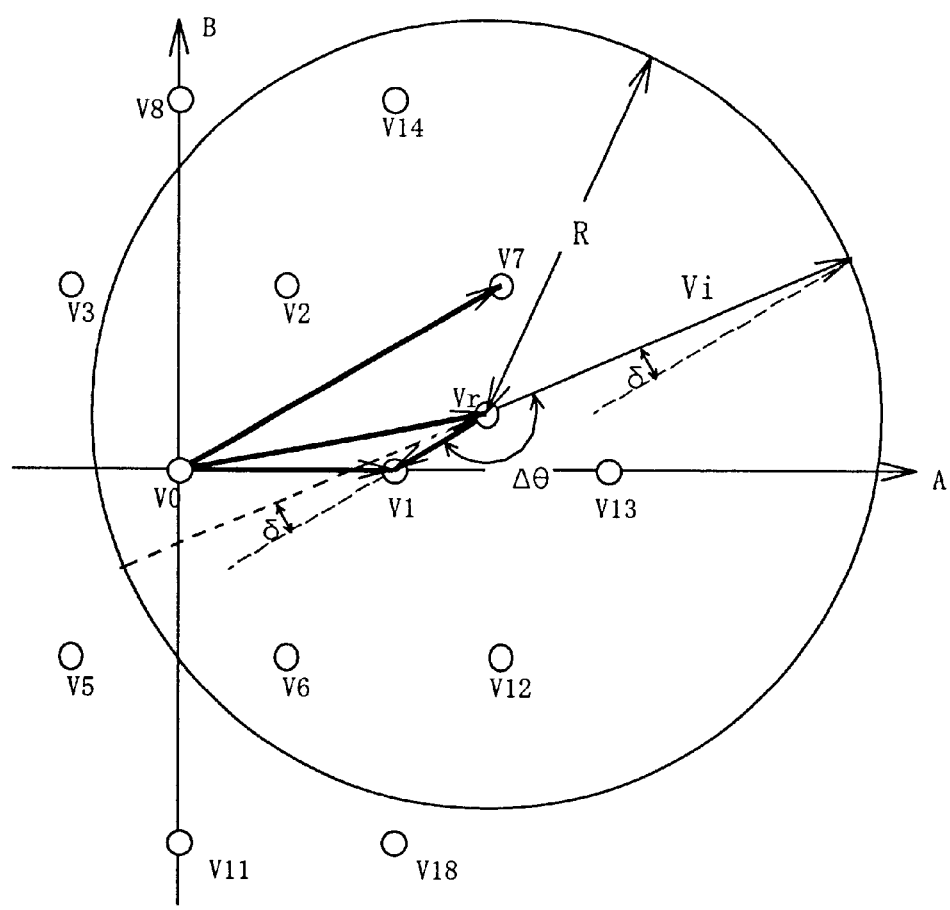
FIG. 6 is a vector diagram for explaining operations of the vector selector and the output voltage vector selector.

FIG. 6 is a vector diagram for explaining operations of the vector selector 24 and the output voltage vector selector 25. The output voltage vector selector 25 re-selects the output voltage vector Vo if the difference integral vector Vi exceeds a predetermined value of R.

In FIG. 6, the predetermined value used for judging the difference integral vector Vi is expressed by a circle with the radius of "R" that sets a terminal point of the command voltage vector Vr on the center thereof. Assuming that the possible output voltage vector V7 is selected as the output voltage vector Vo, and the difference integral vector Vi exceeds a predetermined value of R as shown in FIG. 6. The vector selector 24 calculates respective angles Δθ formed by the difference integral vector Vi and each of the second difference vectors calculated by the second difference vector calculator 21, and selects one of the possible output voltage vectors V0–V18 which corresponds to one of the second difference vectors making the largest angle Δθ with the difference integral vector Vi and outputs the output voltage vector selecting signal corresponding to the selected possible output voltage vector to the output voltage vector selector 25.

In FIG. 6, since an angle Δθ formed by the possible output voltage vector V1 and the difference integral vector Vi becomes largest, the vector selector 24 outputs an output voltage vector selecting signal for selecting the possible output voltage vector V1 to the output voltage vector selector 25. The output voltage vector selector 25 outputs the possible output voltage vector V1 as the output voltage vector Vo in response to the output voltage vector selecting signal.

The gate signal generator 26 outputs one of switching states of the ON-OFF pattern signals corresponding to the output voltage vector Vo to the power converter on the basis of a relationship among the possible output voltage vectors V0–V18, the output voltage indexes IU, IV and IW, and switching states of the semiconductor switching devices S11–S34.

Accordingly, the terminal point of the difference integral vector Vi having a start point thereof on the terminal point of the command voltage vector Vr moves in a direction of an angle of δ(i.e. 180°−Δθ) apart from a direction of the terminal point of the command voltage vector Vr, and approaches to the terminal point of the command voltage vector Vr taking the shortest route.

According to the first embodiment of the controller of the present invention, it may be realized to provide a high efficient controller for a power converter that may minimize the number of turning ON/OFF of the semiconductor switching devices and reduce the switching losses of the semiconductor switching devices. Further, since the output voltage vector Vo is changed to follow the command voltage vector Vr, a DC voltage is transferred to AC terminals of the converter effectively, thereby obtaining a high converting rate of voltage (high utilization factor). The similar effect may be obtained even if the converter is designed to output three levels of voltages by connecting two power converters that output two levels of voltages with a transformer.

(Second Embodiment)

Figure 7:
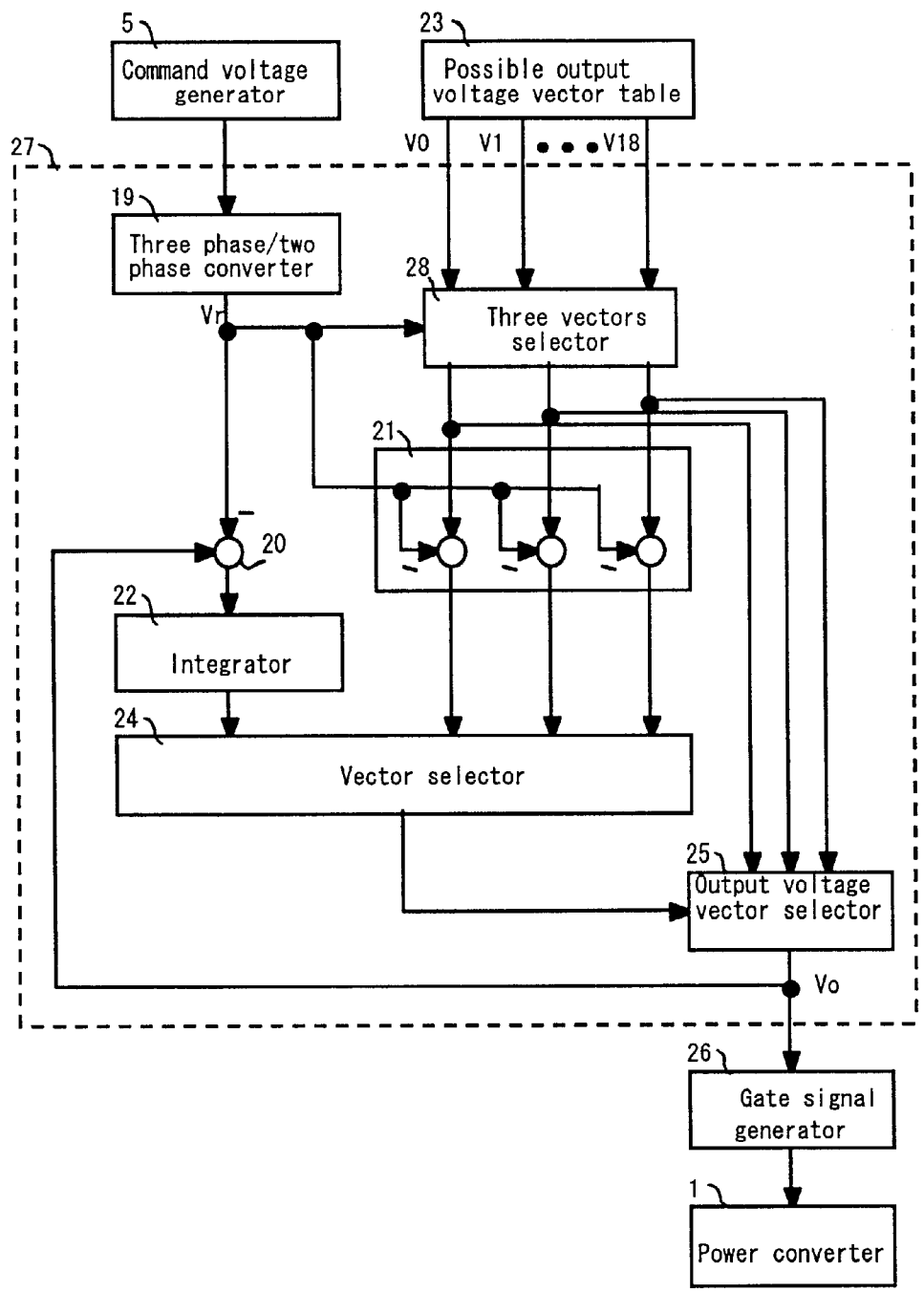
FIG. 7 is a block diagram showing a controller for a power converter of the second embodiment of the present invention.

A second embodiment of the present invention is hereinafter described referring to drawings. FIG. 7 is a block diagram showing a controller for a power converter of the second embodiment of the present invention. A detail description of the same components as the components in FIG. 3 is omitted by appending the same numerals to the corresponding components.

A three vectors selector 28 selects three of the possible output voltage vectors V0–V18 output from the possible output voltage vector table 23. The terminal points of the three possible output voltage vectors surround a terminal point of the command voltage vector Vr. The three vectors selector 28 outputs the three possible output voltage vectors to the second difference vector calculator 21.

An operation of the controller is hereinafter explained. The three-phase/two-phase converter 19 converts the three phase command voltages VU*, VV* and VW* generated from the command voltage generator 5 into A-axis component and B-axis component of the command voltage vector Vr by use of the above mentioned formulas 2 and 3.

The first difference vector calculator 20 calculates a first difference vector by subtracting the command voltage vector Vr from the output voltage vector Vo, and then the integrator 22 calculates a difference integral vector Vi by integrating the first difference vector. The respective A-axis component ViA and B-axis component ViB of the difference integral vector Vi are represented by the above mentioned formulas 4 and 5.

Figure 8:
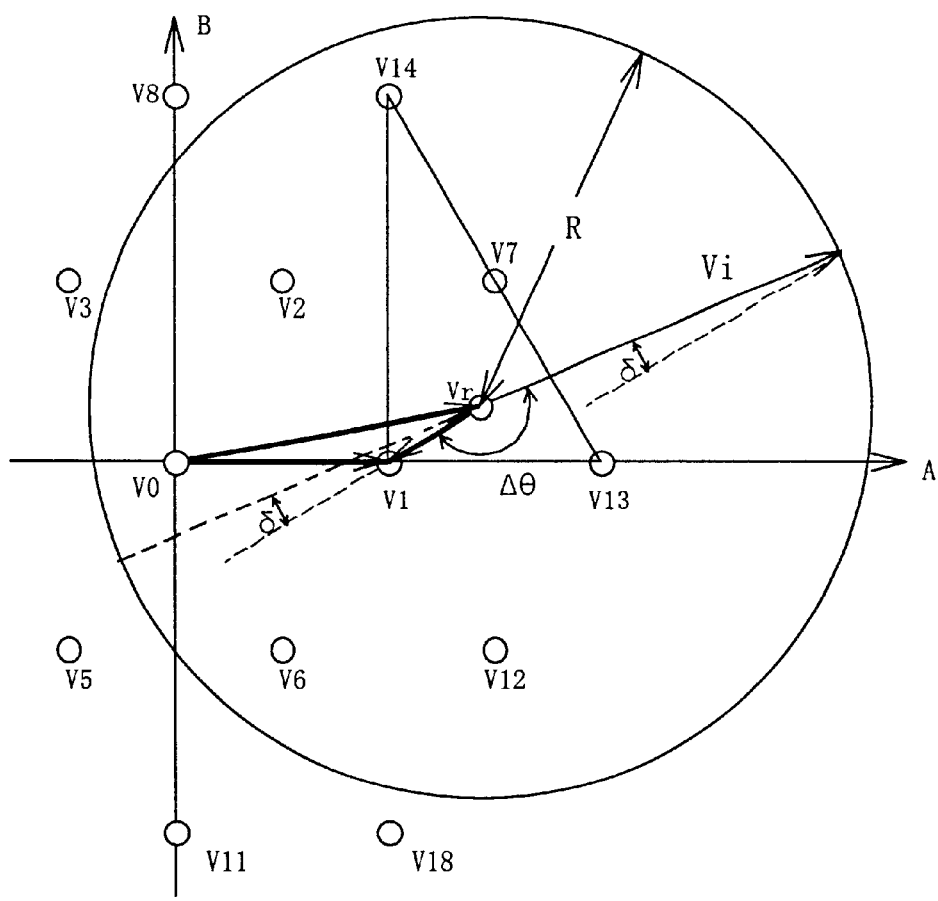
FIG. 8 is a vector diagram for explaining operations of the output voltage vector controller in FIG. 7.

FIG. 8 is a vector diagram for explaining operations of the output voltage vector controller 27 shown in FIG. 7. The three vectors selector 28 selects three of the possible output voltage vectors V0–V18 that the terminal points thereof surround a terminal point of the command voltage vector Vr. For example, in a state of FIG. 8, the possible output voltage vectors V1, V13 and V14 are selected and output to the second difference vector calculator 21. The second difference vector calculator 21 calculates three second difference vectors by subtracting the command voltage vector Vr from each of the possible output voltage vectors V1, V13 and V14, and outputs the three second difference vectors to the vector selector 24.

Assuming that the difference integral vector Vi exceeds a predetermined value of R as shown in FIG. 8. The vector selector 24 calculates respective angles Δθ formed by the difference integral vector Vi and each of the second difference vectors calculated by the second difference vector calculator 21, and selects one of the possible output voltage vectors V1, V13 and V14 which corresponds to one of the second difference vectors making the largest angle Δθ with the difference integral vector Vi and outputs the output voltage vector selecting signal corresponding to the selected possible output voltage vector to the output voltage vector selector 25.

In FIG. 8, since an angle Δθ formed by the possible output voltage vector V1 and the difference integral vector Vi becomes largest, the vector selector 24 outputs an output voltage vector selecting signal for selecting the possible output voltage vector V1 to the output voltage vector selector 25. The output voltage vector selector 25 outputs the possible output voltage vector V1 as the output voltage vector Vo in response to the output voltage vector selecting signal.

The gate signal generator 26 outputs one of switching state of the ON-OFF pattern signals corresponding to the output voltage vector Vo to the power converter on the basis of a relationship among the possible output voltage vectors V0–V18, the output voltage indexes IU, IV and IW, and switching states of the semiconductor switching devices S11–S34.

Accordingly, the terminal point of the difference integral vector Vi having a start point thereof on the terminal point of the command voltage vector Vr moves in a direction of an angle of $\delta$(i.e. $180°-\Delta\theta$) apart from a direction of the terminal point of the command voltage vector Vr, and approaches to the terminal point of the command voltage vector Vr taking the shortest route.

According to the second embodiment of the controller of the present invention, it may be realized to provide a high efficient controller for a power converter that may minimize the number of turning ON/OFF of the semiconductor switching devices and reduce the switching losses of the semiconductor switching devices. Further, since the output voltage vector Vo is changed to follow the command voltage vector Vr, a DC voltage is transferred to AC terminals of the converter effectively, thereby obtaining a high converting rate of voltage (high utilization factor).

(Third Embodiment)

Figure 9:
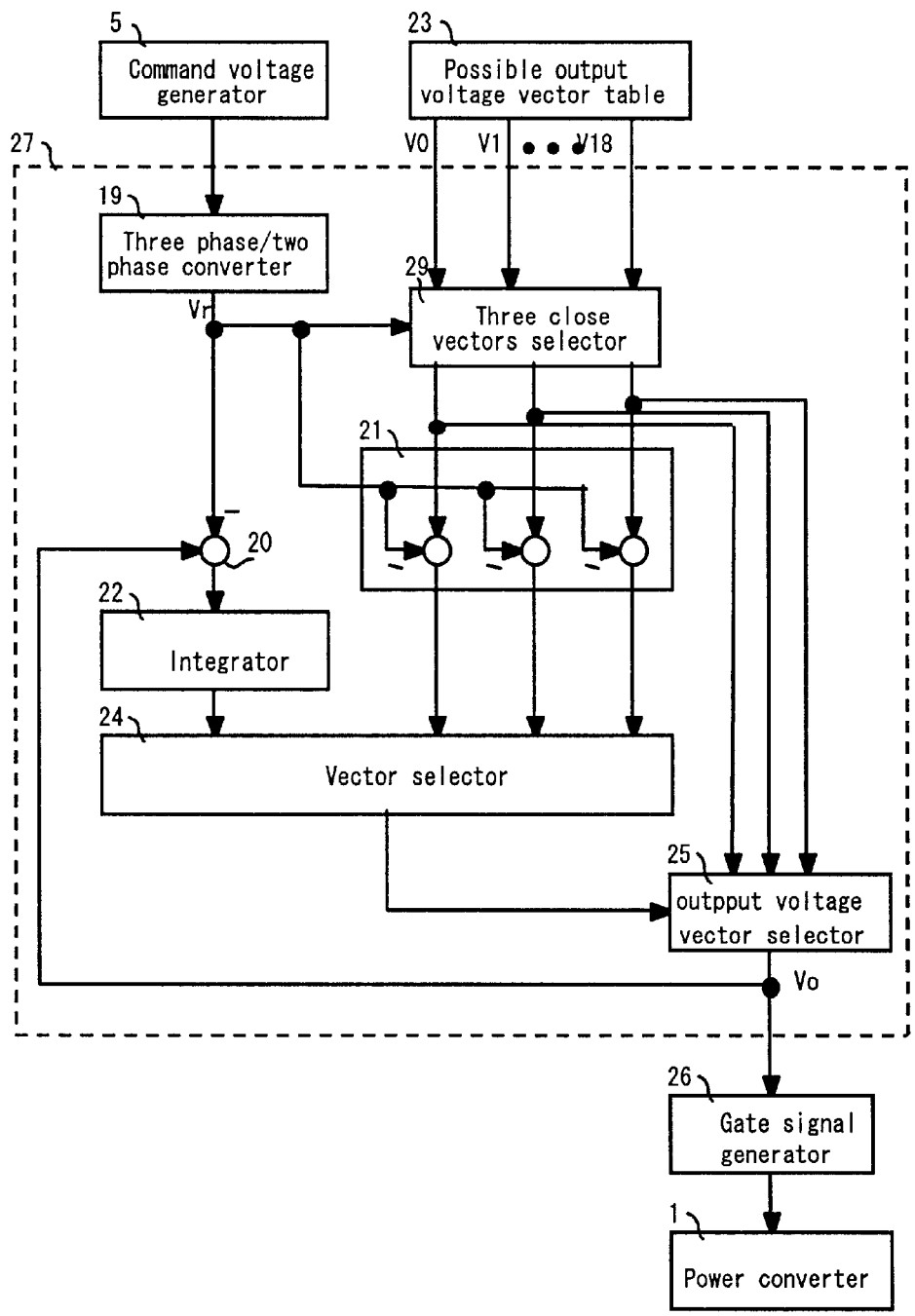
FIG. 9 is a block diagram showing a controller for a power converter of the third embodiment of the present invention.

A third embodiment of the present invention is hereinafter described referring to drawings. FIG. 9 is a block diagram showing a controller for a power converter of the third embodiment of the present invention. A detail description of the same components as the components in FIG. 3 is omitted by appending the same numerals to the corresponding components.

A three close vectors selector 29 selects three of the possible output voltage vectors V0–V18 output from the possible output voltage vector table 23. The terminal points of the three possible output voltage vectors surround a terminal point of the command voltage vector Vr and stand closest. The three close vectors selector 29 outputs the three possible output voltage vectors to the second difference vector calculator 21.

An operation of the controller is hereinafter explained. The three-phase/two-phase converter 19 converts the three phase command voltages VU*, VV* and VW* generated from the command voltage generator 5 into A-axis component and B-axis component of the command voltage vector Vr by use of the above-mentioned formulas 2 and 3.

The first difference vector calculator 20 calculates a first difference vector by subtracting the command voltage vector Vr from the output voltage vector Vo, and then the integrator 22 calculates a difference integral vector Vi by integrating the first difference vector. The respective A-axis component ViA and B-axis component ViB of the difference integral vector Vi are represented by the above-mentioned formulas 4 and 5.

Figure 10:
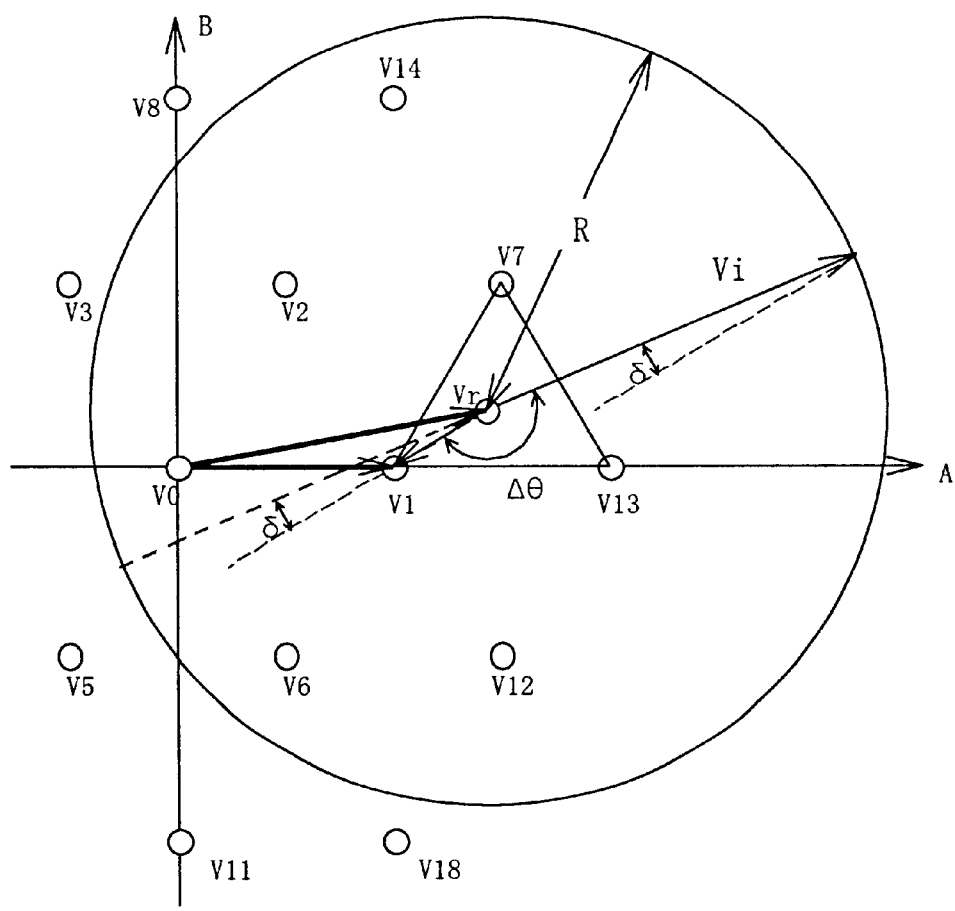
FIG. 10 is a vector diagram for explaining operations of the output voltage vector controller in FIG. 9.

FIG. 10 is a vector diagram for explaining operations of the output voltage vector controller 27 shown in FIG. 9. The three close vectors selector 29 selects three of the possible output voltage vectors V0–V18, that the terminal points thereof stand at the nearest from a terminal point of the command voltage vector Vr and surround the terminal point of the command voltage vector Vr. For example, in a state of FIG. 10, the possible output voltage vectors V1, V7 and V13 are selected and output to the second difference vector calculator 21. The second difference vector calculator 21 calculates three second difference vectors by subtracting the command voltage vector Vr from each of the possible output voltage vectors V1, V7 and V13, and outputs the three second difference vectors to the vector selector 24.

Assuming that the difference integral vector Vi exceeds a predetermined value of R as shown in FIG. 10. The vector selector 24 calculates respective angles $\Delta\theta$ formed by the difference integral vector Vi and each of the second difference vectors calculated by the second difference vector calculator 21, and selects one of the possible output voltage vectors V1, V7 and V13 which corresponds to one of the second difference vectors making the largest angle $\Delta\theta$ with the difference integral vector Vi and outputs the output voltage vector selecting signal corresponding to the selected possible output voltage vector to the output voltage vector selector 25.

In FIG. 10, since an angle $\Delta\theta$ formed by the possible output voltage vector V1 and the difference integral vector Vi becomes largest, the vector selector 24 outputs an output voltage vector selecting signal for selecting the possible output voltage vector V1 to the output voltage vector selector 25. The output voltage vector selector 25 outputs the possible output voltage vector V1 as the output voltage vector Vo in response to the output voltage vector selecting signal.

The gate signal generator 26 outputs one of switching state of the ON-OFF pattern signals corresponding to the output voltage vector Vo to the power converter on the basis of a relationship among the possible output voltage vectors V0–V18, the output voltage indexes IU, IV and IW, and switching states of the semiconductor switching devices S11–S34.

Accordingly, the terminal point of the difference integral vector Vi having a start point thereof on the terminal point of the command voltage vector Vr moves in a direction of an angle of $\beta$(i.e. $180°-\Delta\theta$) apart from a direction of the terminal point of the command voltage vector Vr, and approaches to the terminal point of the command voltage vector Vr taking the shortest route.

According to the second embodiment of the controller of the present invention, it may be realized to provide a high efficient controller for a power converter that may minimize the number of turning ON/OFF of the semiconductor switching devices and reduce the switching losses of the semiconductor switching devices. Further, since the output voltage vector Vo is changed to follow the command voltage vector Vr, a DC voltage is transferred to AC terminals of the converter effectively, thereby obtaining a high converting rate of voltage(high utilization factor).

(Fourth Embodiment)

Figure 11:
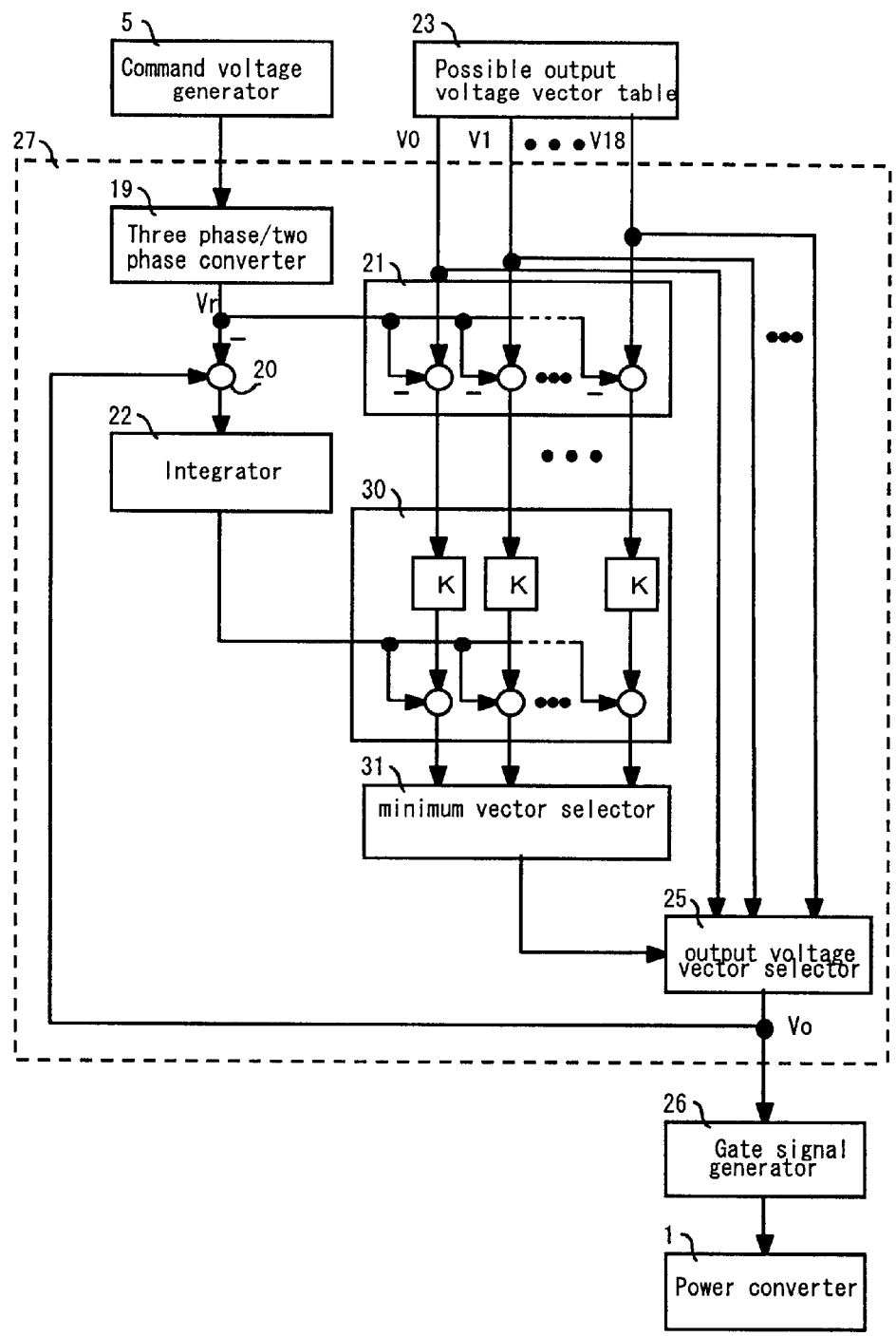
FIG. 11 is a block diagram showing a controller for a power converter of the fourth embodiment of the present invention.

A fourth embodiment of the present invention is hereinafter described referring to drawings. FIG. 11 is a block diagram showing a controller for a power converter of the fourth embodiment of the present invention. A detail description of the same components as the components in FIG. 3 is omitted by appending the same numerals to the corresponding components.

A composite vector calculator 30 first calculates nineteen multiplication vectors by multiplying each of the second difference vectors calculated by the second difference vector calculator 21 by a constant of K, and then calculates composite vectors by adding the difference integral vector Vi to each of the multiplication vectors. The composite vector calculator 30 outputs the composite vectors to a minimum vector selector 31.

The minimum vector selector 31 selects one of the possible output voltage vectors which corresponds to one of the second difference vectors making the composite vectors smallest and outputs an output voltage vector selecting signal corresponding to the selected possible output voltage vector to an output voltage vector selector 25.

An operation of the controller is hereinafter explained. The three-phase/two-phase converter 19 converts the three phase command voltages VU*, VV* and VW* generated from the command voltage generator 5 into A-axis component and B-axis component of the command voltage vector Vr by use of the above-mentioned formulas 2 and 3.

The first difference vector calculator 20 calculates a first difference vector by subtracting the command voltage vector Vr from the output voltage vector Vo, and then the integrator 22 calculates a difference integral vector Vi by integrating the first difference vector. The respective A-axis component ViA and B-axis component ViB of the difference integral vector Vi are represented by the above-mentioned formulas 4 and 5.

Figure 12:
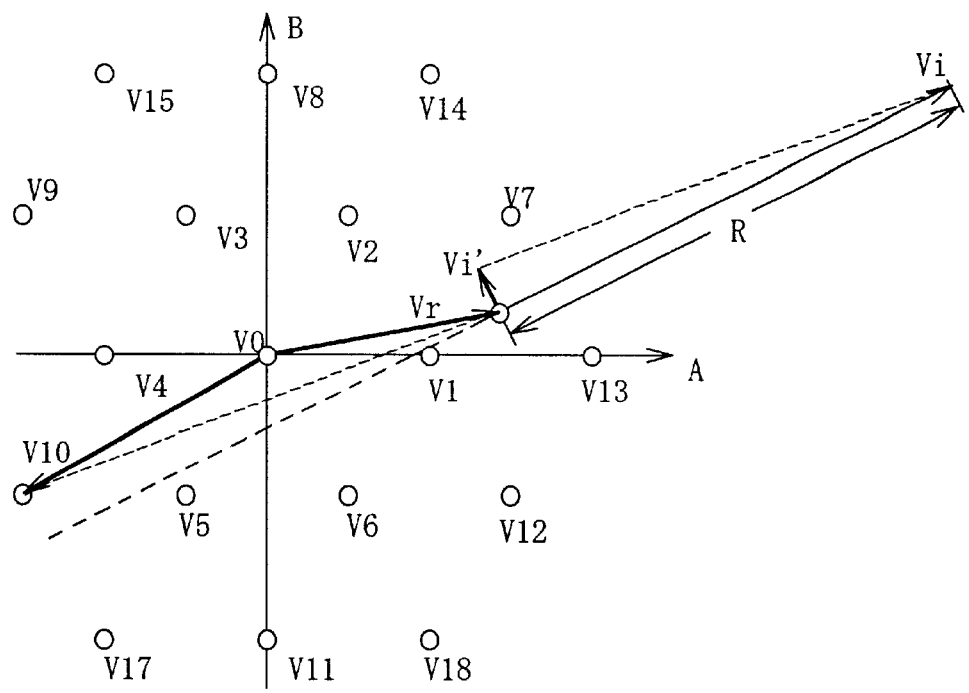
FIG. 12 is a vector diagram for explaining operations of the output voltage vector controller in FIG. 11.

FIG. 12 is a vector diagram for explaining operations of the output voltage vector controller 27 shown in FIG. 11. In FIG. 12, the composite vector calculator 30 takes 1 for a constant K for convenience. The output voltage vector selector 25 re-selects the output voltage vector Vo if the difference integral vector Vi exceeds a predetermined value of R. Assuming that the difference integral vector Vi exceeds a predetermined value of R as shown in FIG. 12. The minimum vector selector 31 selects one of the possible output voltage vectors which corresponds to one of the second difference vectors making the composite vectors smallest and outputs an output voltage vector selecting signal corresponding to the selected possible output voltage vector to an output voltage vector selector 25.

In FIG. 12, the possible output voltage vector V10 is selected in the minimum vector selector 31. The difference integral vector Vi changes for Vi' that is calculated by subtracting the possible output voltage vector V10 from the command voltage vector Vr. The output voltage vector selector 25 outputs the possible output voltage vector V10 as the output voltage vector Vo in response to the output voltage vector selecting signal.

The gate signal generator 26 outputs one of switching states of the ON-OFF pattern signals corresponding to the output voltage vector Vo to the power converter on the basis of a relationship among the possible output voltage vectors V0–V18, the output voltage indexes IU, IV and IW, and switching states of the semiconductor switching devices S11–S34.

Accordingly, the terminal point of the difference integral vector Vi having a start point thereof on the terminal point of the command voltage vector Vr approaches to the terminal point of the command voltage vector Vr in the shortest time.

According to the fourth embodiment of the controller of the present invention, it may be realized to provide a high efficient controller for a power converter that may minimize the number of turning ON/OFF of the semiconductor switching devices and reduce the switching losses of the semiconductor switching devices. Further, since the output voltage vector Vo is changed to follow the command voltage vector Vr, a DC voltage is transferred to AC terminals of the converter effectively, thereby obtaining a high converting rate of voltage(high utilization factor).

(Fifth Embodiment)

Figure 13:
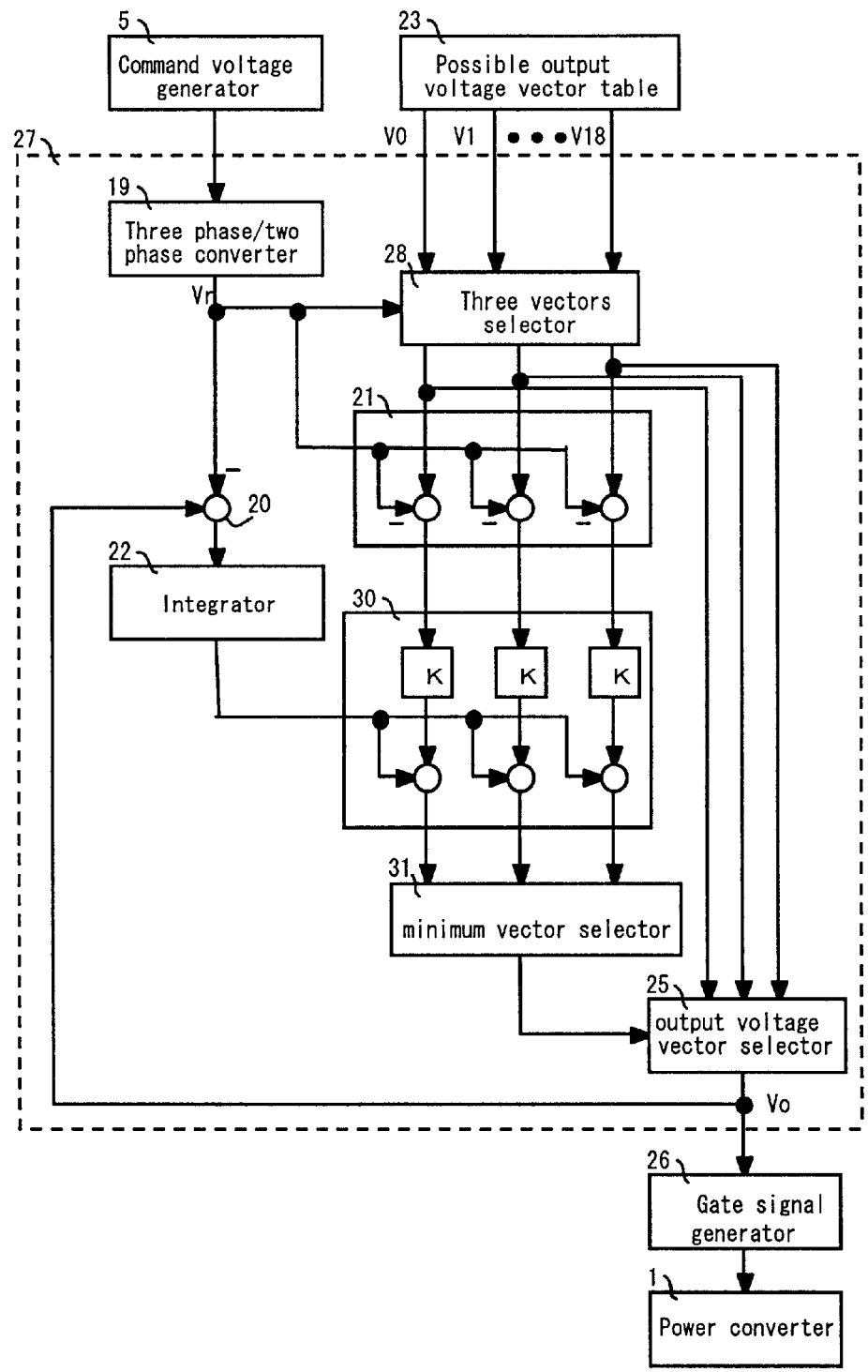
FIG. 13 is a block diagram showing a controller for a power converter of the fifth embodiment of the present invention.

A fifth embodiment of the present invention is hereinafter described referring to drawings. FIG. 13 is a block diagram showing a controller for a power converter of the fifth embodiment of the present invention. A detail description of the same components as the components in FIGS. 7 and 11 is omitted by appending the same numerals to the corresponding components.

An operation of the controller shown in FIG. 13 is hereinafter explained. The three-phase/two-phase converter 19 converts the three phase command voltages VU*, VV* and VW* generated from the command voltage generator 5 into A-axis component and B-axis component of the command voltage vector Vr by use of the above-mentioned formulas 2 and 3.

The first difference vector calculator 20 calculates a first difference vector by subtracting the command voltage vector Vr from the output voltage vector Vo, and then the integrator 22 calculates a difference integral vector Vi by integrating the first difference vector. The respective A-axis component ViA and B-axis component ViB of the difference integral vector Vi are represented by the above-mentioned formulas 4 and 5.

Figure 14:
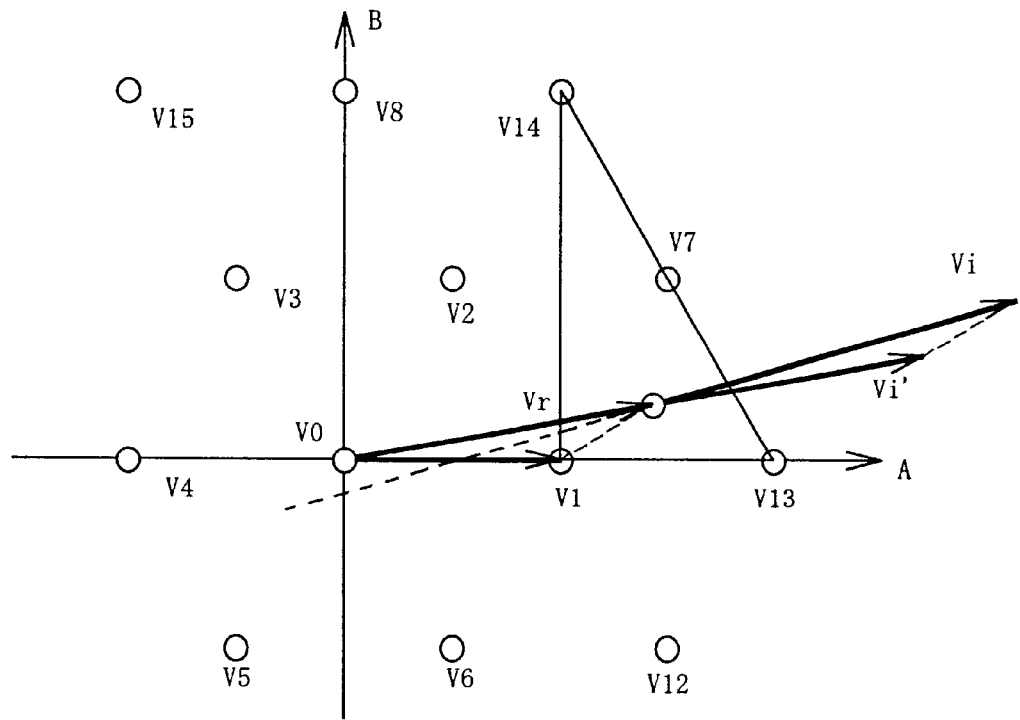
FIG. 14 is a vector diagram for explaining operations of the output voltage vector controller in FIG. 13.

FIG. 14 is a vector diagram for explaining operations of the output voltage vector controller 27 shown in FIG. 13. In FIG. 14, the composite vector calculator 30 takes 1 for a constant K for convenience. The output voltage vector selector 25 re-selects the output voltage vector Vo if the difference integral vector Vi exceeds a predetermined value of R. Assuming that the difference integral vector Vi exceeds a predetermined value of R as shown in FIG. 14. The three vectors selector 28 selects three of the possible output voltage vectors V0–V18 that the terminal points thereof surround a terminal point of the command voltage vector Vr. For example, in a state of FIG. 14, the possible output voltage vectors V1, V13 and V14 are selected and output to the second difference vector calculator 21. The second difference vector calculator 21 calculates three second difference vectors by subtracting the command voltage vector Vr from each of the possible output voltage vectors V1, V13 and V14, and outputs the three second difference vectors to the composite vector calculator 30. The composite vector calculator 30 first calculates three multiplication vectors by multiplying each of the three second difference vectors calculated by the second difference vector calculator 21 by a constant K, then calculates composite vectors by adding the difference integral vector Vi to each of the three multiplication vectors, and finally outputs the composite vectors to the minimum vector selector 31. The minimum vector selector 31 selects one of the possible output voltage vectors which corresponds to one of the second difference vectors making the composite vectors smallest and outputs an output voltage vector selecting signal corresponding to the selected possible output voltage vector to an output voltage vector selector 25.

In FIG. 14, the possible output voltage vector V1 is selected in the minimum vector selector 31. The difference integral vector Vi changes for Vi' that is calculated by subtracting the possible output voltage vector V1 from the command voltage vector Vr. The output voltage vector selector 25 outputs the possible output voltage vector V1 as the output voltage vector Vo in response to the output voltage vector selecting signal.

The gate signal generator 26 outputs one of switching states of the ON-OFF pattern signals corresponding to the output voltage vector Vo to the power converter on the basis of a relationship among the possible output voltage vectors V0–V18, the output voltage indexes IU, IV and IW, and switching states of the semiconductor switching devices S11–S34.

Accordingly, the terminal point of the difference integral vector Vi having a start point thereof on the terminal point of the command voltage vector Vr approaches to the terminal point of the command voltage vector Vr in the shortest time.

According to the fifth embodiment of the controller of the present invention, it may be realized to provide a high efficient controller for a power converter that may minimize the number of turning ON/OFF of the semiconductor switching devices and reduce the switching losses of the semiconductor switching devices. Further, since the output voltage vector Vo is changed to follow the command voltage vector Vr, a DC voltage is transferred to AC terminals of the converter effectively, thereby obtaining a high converting rate of voltage(high utilization factor).

(Sixth Embodiment)

Figure 15:
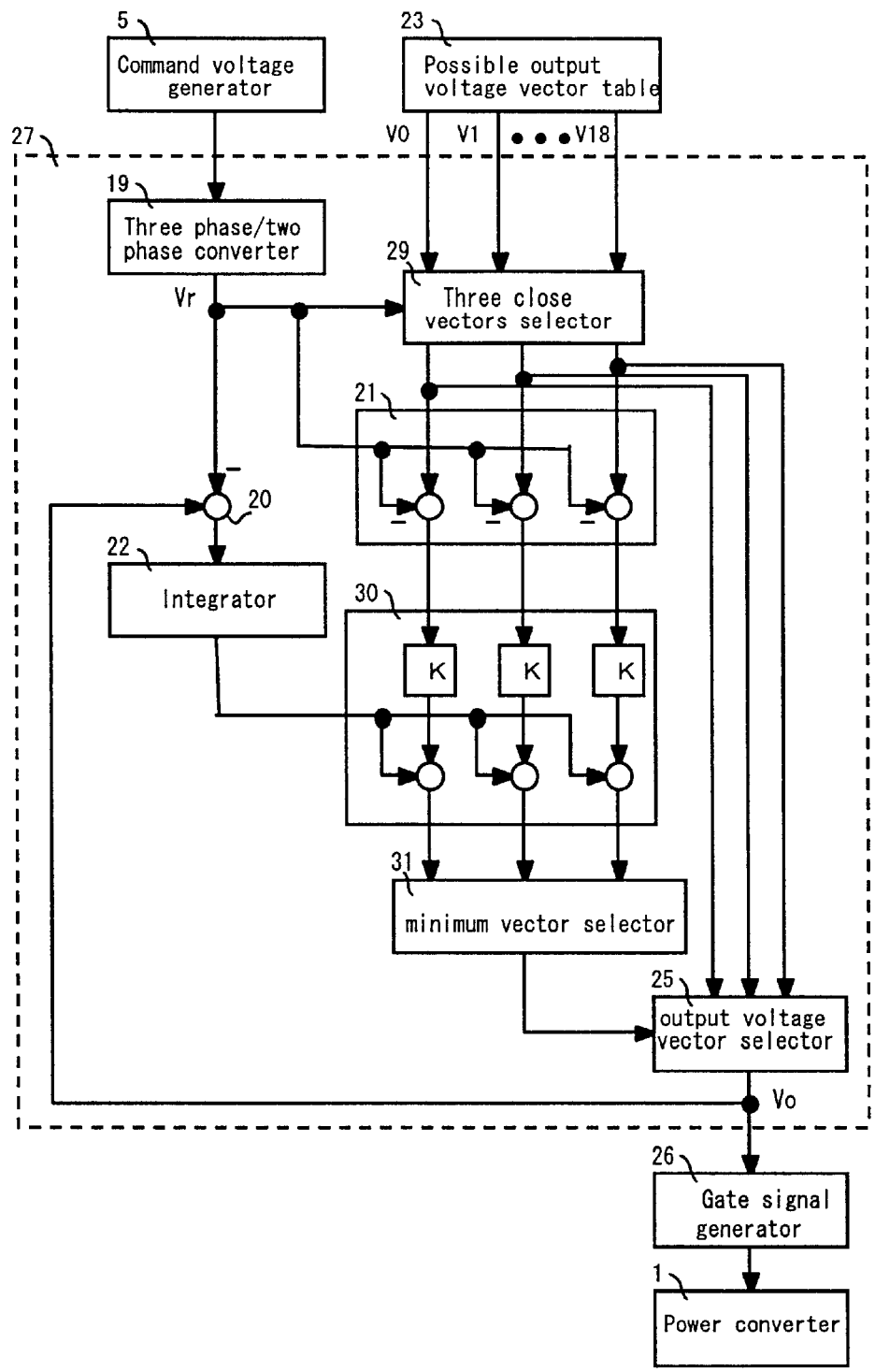
FIG. 15 is a block diagram showing a controller for a power converter of the sixth embodiment of the present invention.

A sixth embodiment of the present invention is hereinafter described referring to drawings. FIG. 15 is a block diagram showing a controller for a power converter of the sixth embodiment of the present invention. A detail description of the same components as the components in FIGS. 9 and 11 is omitted by appending the same numerals to the corresponding components.

An operation of the controller shown in FIG. 15 is hereinafter explained. The three-phase/two-phase converter 19 converts the three phase command voltages VU*, VV* and VW* generated from the command voltage generator 5 into A-axis component and B-axis component of the command voltage vector Vr by use of the above-mentioned formulas 2 and 3.

The first difference vector calculator 20 calculates a first difference vector by subtracting the command voltage vector Vr from the output voltage vector Vo, and then the integrator 22 calculates a difference integral vector Vi by integrating the first difference vector. The respective A-axis component ViA and B-axis component ViB of the difference integral vector Vi are represented by the above-mentioned formulas 4 and 5.

Figure 16:
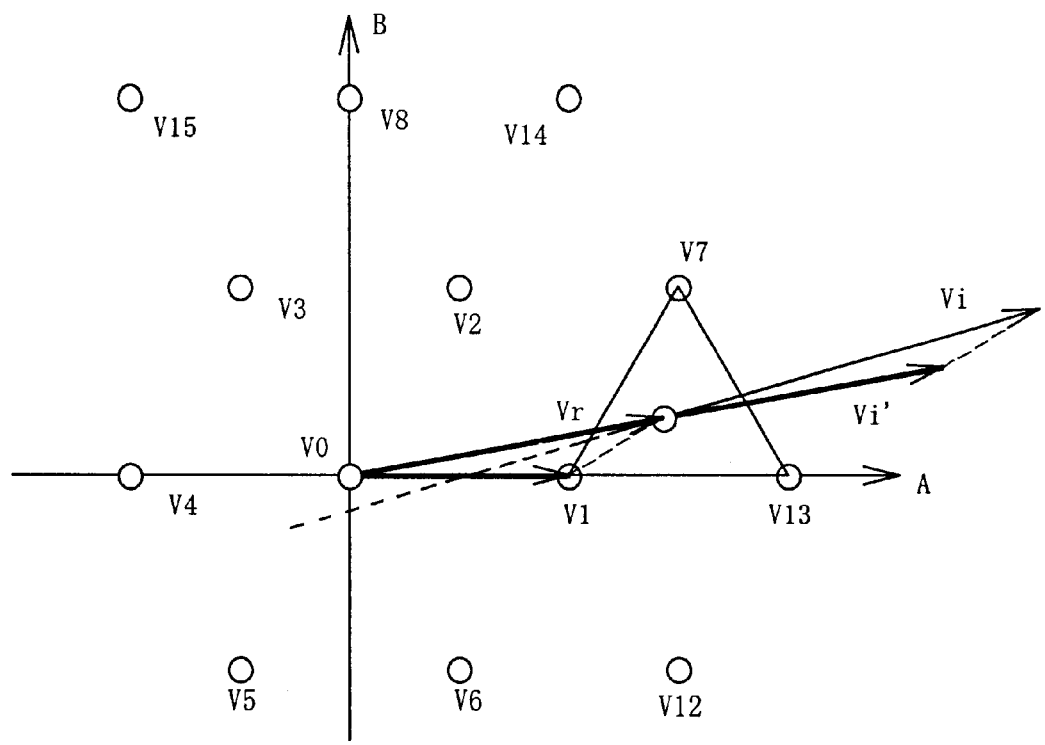
FIG. 16 is a vector diagram for explaining operations of the output voltage vector controller in FIG. 15.

FIG. 16 is a vector diagram for explaining operations of the output voltage vector controller 27 shown in FIG. 15. In FIG. 16, the composite vector calculator 30 takes 1 for a constant K for convenience. The output voltage vector selector 25 re-selects the output voltage vector Vo if the difference integral vector Vi exceeds a predetermined value of R.

Assuming that the difference integral vector Vi exceeds a predetermined value of R as shown in FIG. 16. The three close vectors selector 29 selects three of the possible output voltage vectors V0–V18, that the terminal points thereof stand at the nearest from a terminal point of the command voltage vector Vr and surround the terminal point of the command voltage vector Vr. For example, in a state of FIG. 16, the possible output voltage vectors V1, V7 and V13 are selected and output to the second difference vector calculator 21. The second difference vector calculator 21 calculates three second difference vectors by subtracting the command voltage vector Vr from each of the possible output voltage vectors V1, V7 and V13, and outputs the three second difference vectors to the composite vector calculator 30. The composite vector calculator 30 first calculates three multiplication vectors by multiplying each of the three second difference vectors calculated by the second difference vector calculator 21 by a constant K, then calculates composite vectors by adding the difference integral vector Vi to each of the three multiplication vectors, and finally outputs the composite vectors to the minimum vector selector 31.

The minimum vector selector 31 selects one of the possible output voltage vectors which corresponds to one of the second difference vectors making the composite vectors smallest and outputs an output voltage vector selecting signal corresponding to the selected possible output voltage vector to an output voltage vector selector 25. In FIG. 16, the possible output voltage vector V1 is selected in the minimum vector selector 31. The difference integral vector Vi changes for Vi' that is calculated by subtracting the possible output voltage vector V1 from the command voltage vector Vr. The output voltage vector selector 25 outputs the possible output voltage vector V1 as the output voltage vector Vo in response to the output voltage vector selecting signal.

The gate signal generator 26 outputs one of switching states of the ON-OFF pattern signals corresponding to the output voltage vector Vo to the power converter on the basis of a relationship among the possible output voltage vectors V0–V18, the output voltage indexes IU, IV and IW, and switching states of the semiconductor switching devices S11–S34.

Accordingly, the terminal point of the difference integral vector Vi having a start point thereof on the terminal point of the command voltage vector Vr approaches to the terminal point of the command voltage vector Vr in the shortest time.

According to the sixth embodiment of the controller of the present invention, it may be realized to provide a high efficient controller for a power converter that may minimize the number of turning ON/OFF of the semiconductor switching devices and reduce the switching losses of the semiconductor switching devices. Further, since the output voltage vector Vo is changed to follow the command voltage vector Vr, a DC voltage is transferred to AC terminals of the converter effectively, thereby obtaining a high converting rate of voltage (high utilization factor).

(Seventh Embodiment)

Figure 17:
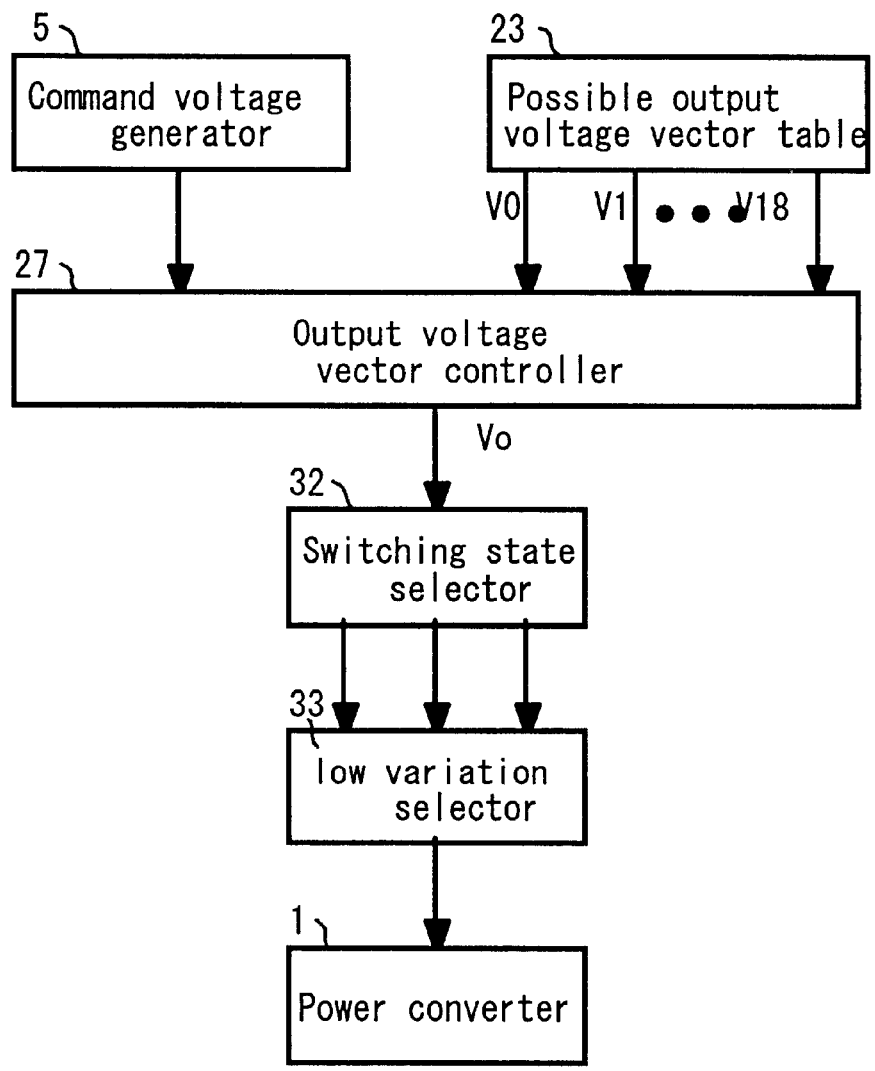
FIG. 17 is a block diagram showing a controller for a power converter of the seventh embodiment of the present invention.

A seventh embodiment of the present invention is hereinafter described referring to drawings. FIG. 17 is a block diagram showing a controller for a power converter of the seventh embodiment of the present invention. A detail description of the same components as the components in FIGS. 3 and 11 is omitted by appending the same numerals to the corresponding components.

A switching state selector 32 selects switching states corresponding to the output voltage vector Vo from the output voltage vector controller 27, and outputs the switching states to a low variation switching state selector 33. Each of the switching states represents a plurality of ON-OFF pattern signals G11–G34 for the semiconductor switching devices S11–S34.

The low variation switching state selector 33 selects one of the switching states that has less variation of the ON-OFF pattern signals G11–G34 compared to the present switching state, and outputs the ON-OFF pattern signals G11–G34 that corresponds to the selected switching state to the power converter.

An operation of the controller shown in FIG. 17 is hereinafter explained. Assuming that the present output voltage vector Vo corresponds to the possible output voltage vector V7. In this case, there is only one switching state of the semiconductor switching device S11–S34 that realizes the possible output voltage vector V7 as shown in the following table 2.

TABLE 2

| Semiconductor devices | S11,S12,S13,S14 | S21,S22,S23,S24 | S31,S32,S33,S34 |
|---|---|---|---|
| Switching state | ON, ON, OFF,OFF | OFF,ON, ON, OFF | OFF,OFF,ON, ON |

Assuming that the output voltage vector Vo changes for the possible output voltage vector V1 at the next stage. There are two patterns of switching states that realize the possible output voltage vector V1 as shown in the following table 3. The switching state selector 32 outputs the two patterns of switching states to the low variation switching state selector 33.

TABLE 3

| Semiconductor devices | | S11,S12,S13,S14 | S21,S22,S23,S24 | S31,S32,S33,S34 |
|---|---|---|---|---|
| Switching states | Pattern 1 | OFF,ON, ON, OFF | OFF,OFF,ON, ON | OFF,OFF,ON, ON |
| | Pattern 2 | ON, ON, OFF,OFF | OFF,ON, ON, OFF | OFF,ON, ON, OFF |

With regard to the pattern 1, four ON-OFF pattern signals for the semiconductor switching devices S11, S13, S22 and S24 vary. On the other hand, with regard to the pattern 2, only two ON-OFF pattern signals for the semiconductor switching devices S32 and S34 vary. Therefore, the low variation switching state selector 33 selects and outputs the pattern 2 of switching state to the power converter. Further, even if a change of the output voltage vector Vo is different from the above-mentioned change (e.i. V7→V1), the low variation switching state selector 33 selects one of the switching states that has less variation of the ON-OFF pattern signals G11–G34 compared to the present switching state in the same way as the above-mentioned change.

According to the seventh embodiment of the controller of the present invention, it may be realized to provide a high efficient controller for a power converter that may minimize the number of turning ON/OFF of the semiconductor switching devices and reduce the switching losses of the semiconductor switching devices.

(Eighth Embodiment)

Figure 18:
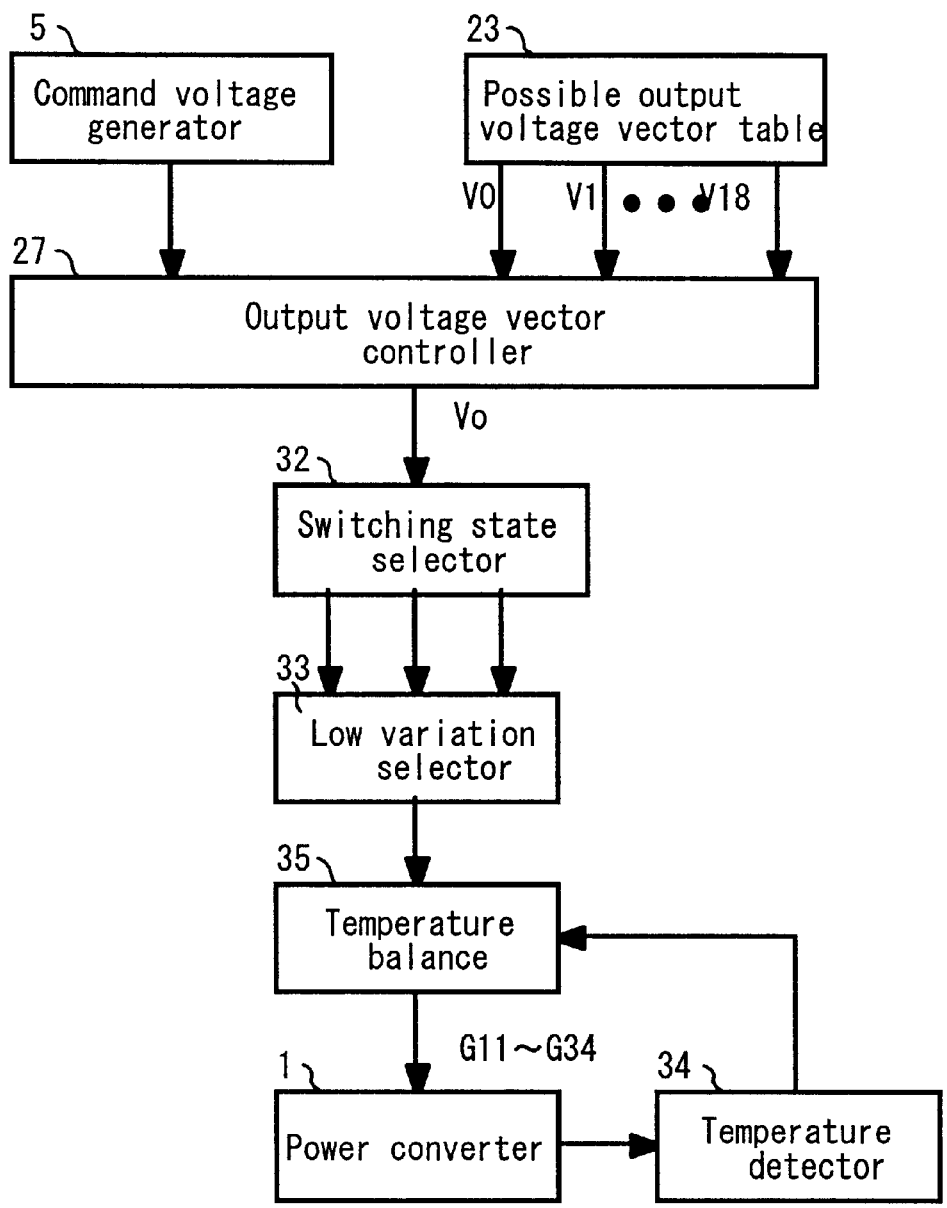
FIG. 18 is a block diagram showing a controller for a power converter of the eighth embodiment of the present invention.

An eighth embodiment of the present invention is hereinafter described referring to drawings. FIG. 18 is a block diagram showing a controller for a power converter of the eighth embodiment of the present invention. A detail description of the same components as the components in FIGS. 3–17 is omitted by appending the same numerals to the corresponding components.

A temperature detector 34 detects temperatures of the semiconductor switching devices S11–S34 individually and outputs the temperatures to a temperature balance controller 35.

The temperature balance controller 35 selects and outputs one of switching states of the ON-OFF pattern signals G11–G34 so as not to cause temperature imbalance among the semiconductor switching devices S11–S34 only if the output voltage vector Vo corresponds to the possible output voltage vector V0.

An operation of the controller shown in FIG. 18 is hereinafter explained. On the basis of the temperatures of the semiconductor switching devices S11–S34, the temperature balance controller 35 determines a switching state of the ON-OFF pattern signals G11–G34 so as to turn on both the second line of the semiconductor switching devices S12, S22 and S32, and the third line of the semiconductor switching devices S13, S23 and S33, and to turn off both the first line of the semiconductor switching devices S11, S21 and S31, and the fourth line of the semiconductor switching devices S14, S24 and S34, if any one of either the first line of the semiconductor switching devices S11, S21 and S31, or the fourth line of the semiconductor switching devices S14, S24 and S34 has the highest temperature in the semiconductor switching devices S11–S34.

On the other hand, if any one of either the second line of the semiconductor switching devices S12, S22 and S32, or the third line of the semiconductor switching devices S13, S23 and S33 has the highest temperature in the semiconductor switching devices S11–S34, the temperature balance controller 35 determines a switching state of the ON-OFF pattern signals G11–G34 so as to turn on either one of the second line of the semiconductor switching devices S12, S22 and S32 or the third line of the semiconductor switching devices S13, S23 and S33, not containing the semiconductor switching device having the highest temperature.

That is, if one of the second line of the semiconductor switching devices S12, S22 and S32 has the highest temperature, the temperature balance controller 35 determines a switching state of the ON-OFF pattern signals G11–G34 so as to turn on both the first line of the semiconductor switching devices S11, S21 and S31, and the third line of the semiconductor switching devices S13, S23 and S33, and to turn off the other lines of the semiconductor switching devices S12–S32 and S14–S34. Likewise, if one of the third line of the semiconductor switching devices S13, S23 and S33 has the highest temperature, the temperature balance controller 35 determines a switching state of the ON-OFF pattern signals G11–G34 so as to turn on both the second line of the semiconductor switching devices S12, S22 and S32 and the fourth line of the semiconductor switching devices S14, S24 and S34, and to turn off the other lines of the semiconductor switching devices S11–S31 and S13–S33.

Accordingly, since a current is controlled not to flow into the semiconductor switching device having the highest temperature, temperature imbalance among the semiconductor switching devices S11–S34 reduces.

According to the eighth embodiment, it may be realized to provide a controller for a power converter that may prevent only specific semiconductor switching devices from heating up and from thermal breaking beforehand.

Further, if the highest temperature of the semiconductor switching device is much lower than the thermal capacity of the semiconductor switching device, a switching state of the ON-OFF pattern signals G11–G34 that is selected by the low variation switching state selector 33 may be output to the power controller 1 as it is. As a result, unnecessary switching of the semiconductor switching devices S11–S34 may decrease, thereby reducing switching losses.

(Ninth Embodiment)

Figure 19:
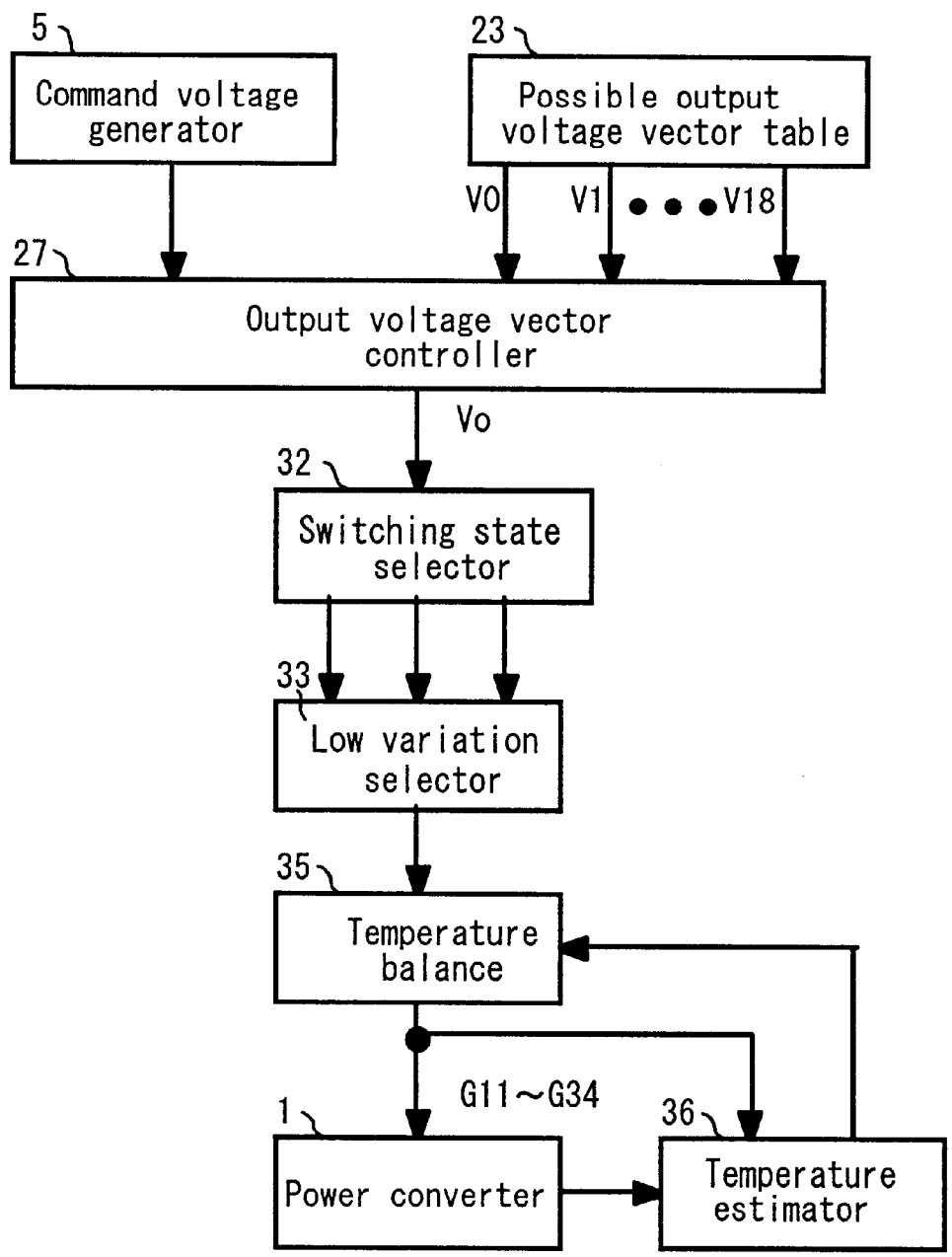
FIG. 19 is a block diagram showing a controller for a power converter of the ninth embodiment of the present invention.

A ninth embodiment of the present invention is hereinafter described referring to drawings. FIG. 19 is a block diagram showing a controller for a power converter of the ninth embodiment of the present invention. A detail description of the same components as the components in FIG. 18 is omitted by appending the same numerals to the corresponding components.

A temperature estimator 36 estimates temperatures of the semiconductor switching devices S11–S34 individually on the basis of AC currents iu, iv and iw of the power converter 1, DC voltages Edp and Edn, and the ON-OFF pattern signals G11–G34, and outputs the estimated temperatures to a temperature balance controller 35.

An operation of the controller shown in FIG. 19 is hereinafter explained. An energy that is consumed by the semiconductor switching device may be calculated by a current flowing into the semiconductor switching device and a voltage applying to the terminals of the semiconductor switching device. The current flowing into the semiconductor switching device may be calculated on the basis of a switching state of the ON-OFF pattern signals G11–G34 and the AC currents iu, iv and iw.

Further, the voltage that applies to the terminals of the semiconductor switching device may be calculated on the basis of a turn-on property of the semiconductor switching device and the DC voltages Edp and Edn. Therefore, if the turn-on property of the semiconductor switching device is measured beforehand, the energy that is consumed by the semiconductor switching device may be calculated on the basis of the AC currents iu, iv and iw of the power converter 1, the DC voltages Edp and Edn, and the ON-OFF pattern signals G11–G34.

Furthermore, the energy that is consumed by the semiconductor switching device may be calculated by measuring properties in relation to conditions of the AC currents iu, iv and iw of the power converter 1 and the DC voltages Edp and Edn in advance. Accordingly, a temperature of the semiconductor switching device may be estimated on the basis of the energy consumed by the semiconductor switching device, thermal resistant and thermal time constant of cooling fin attached on the semiconductor switching device and a circumambient temperature of the semiconductor switching device.

The temperature balance controller 35 determines a switching state of the ON-OFF pattern signals G11–G34 so as not to heat up only specific semiconductor switching devices by using the estimated temperatures calculated by the temperature estimator 36 in the same way as the eighth embodiment. In this embodiment, since temperatures of the semiconductor switching devices are controlled to be equal to each other, it is not necessarily required to use the circumambient temperatures of the semiconductor switching devices for estimating temperatures of the semiconductor switching devices.

Accordingly, since a current is controlled not to flow into the semiconductor switching device having the highest temperature, temperature imbalance among the semiconductor switching devices S11–S34 reduces.

According to the ninth embodiment, it may be realized to provide a controller for a power converter that may prevent only specific semiconductor switching devices from heating up and from thermal breaking beforehand.

(Tenth Embodiment)

Figure 20:
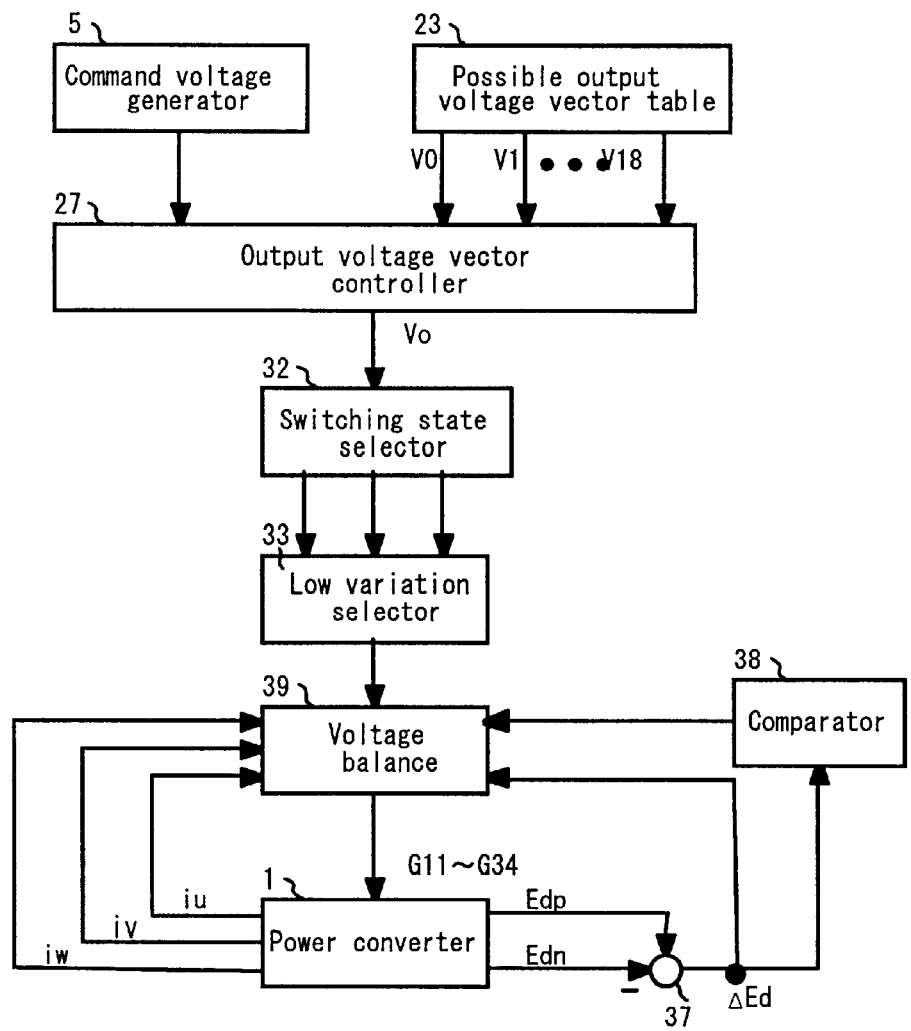
FIG. 20 is a block diagram showing a controller for a power converter of the tenth embodiment of the present invention.

A tenth embodiment of the present invention is hereinafter described referring to drawings. FIG. 20 is a block diagram showing a controller for a power converter of the tenth embodiment of the present invention. A detail description of the same components as the components in FIGS. 3–19 is omitted by appending the same numerals to the corresponding components.

A voltage difference detector 37 detects a DC voltage difference $\Delta Ed$ ($-Edp-Edn$) between the DC voltage Edp of a positive side of the DC capacitor 2 and the DC voltage Edn of a negative side of the DC capacitor 3, and outputs the DC voltage difference $\Delta Ed$ to both a voltage balance controller 39 and a condition comparator 38.

The condition comparator 38 outputs a voltage balancing signal to the voltage balance controller 39 in order to reduce the DC voltage difference $\Delta Ed$, if the DC voltage difference $\Delta Ed$ from the voltage difference detector 37 exceeds a predetermined value.

The voltage balance controller 39 changes a switching state of the ON-OFF pattern signals that is output from the low variation switching state selector 33 in response to the AC currents iu, iv and iw of the power converter 1 so as to reduce the DC voltage difference $\Delta Ed$, if the voltage balance controller 39 receives the voltage balancing signal from the condition comparator 38.

An operation of the controller shown in FIG. 20 is hereinafter explained. The voltage balance controller 39 determines a switching state of the ON-OFF pattern signals G11–G34 so that the power converter 1 outputs voltage that corresponds to the output voltage vector Vo from the output voltage vector controller 27. Therefore, in case that the output voltage vector Vo corresponds to any one of the possible output voltage vectors V7–V18, the voltage balance controller 39 outputs a switching state of the ON-OFF pattern signals G11–G34 selected by the low variation switching state selector 33 to the power converter without changing the switching state, because each of the possible output voltage vectors V7–V18 has the only one switching state.

Further, in case that the output voltage vector Vo corresponds to the possible output voltage vector V0, there are three kinds of switching states. However, the voltage balance controller 39 outputs a switching state of the ON-OFF pattern signals G11–G34 selected by the low variation switching state selector 33 to the power converter without changing the switching state, because each of three switching states may not change the DC voltage difference $\Delta Ed$.

In case that the output voltage vector Vo corresponds to anyone of the possible output voltage vectors V1–V6, the voltage balance controller 39 may function effectively. Conditions of increasing and decreasing the DC voltage difference $\Delta Ed$ are shown in the following table 4 indicating a relationship of the possible output voltage vectors V1–V6 and the switching states of the semiconductor switching devices S11–S34. The voltage balance controller 39 determines a switching state of the ON-OFF pattern signals G11–G34 so as to reduce the DC voltage difference $\Delta Ed$ on the basis of the conditions shown in the table, if the DC voltage difference $\Delta Ed$ exceeds a predetermined value.

TABLE 4

| | Switching states of semiconductor devices | | | Increse conditions | Decrease conditions |
|---|---|---|---|---|---|
| | S11,S12,S13,S14 | S21,S22,S23,S24 | S31,S32,S33,S34 | | |
| V1 | OFF,ON, ON, OFF | OFF,OFF,ON, ON | OFF,OFF,ON, ON | iu>0 | iu<0 |
| | ON, ON, OFF,OFF | OFF,ON, ON, OFF | OFF,ON, ON, OFF | iu<0 | iu>0 |
| V2 | OFF,ON, ON, OFF | OFF,ON, ON, OFF | OFF,OFF,ON, ON | iw<0 | iw>0 |
| | ON, ON, OFF,OFF | ON, ON, OFF,OFF | OFF,ON, ON, OFF | iw>0 | iw<0 |
| V3 | OFF,OFF,ON, ON | OFF,ON, ON, OFF | OFF,OFF,ON, ON | iv>0 | iv<0 |
| | OFF,ON, ON, OFF | ON, ON, OFF,OFF | OFF,ON, ON, OFF | iv<0 | iv>0 |
| V4 | OFF,OFF,ON, ON | OFF,ON, ON, OFF | OFF,ON, ON, OFF | iu<0 | iu>0 |
| | OFF,ON, ON, OFF | ON, ON, OFF,OFF | ON, ON, OFF,OFF | iu>0 | iu<0 |
| V5 | OFF,OFF,ON, ON | OFF,OFF,ON, ON | OFF,ON, ON, OFF | iw>0 | iw<0 |
| | OFF,ON, ON, OFF | OFF,ON, ON, OFF | ON, ON, OFF,OFF | iw<0 | iw>0 |
| V6 | OFF,ON, ON, OFF | OFF,OFF,ON, ON | OFF,ON, ON, OFF | iv<0 | iv>0 |
| | ON, ON, OFF,OFF | OFF,ON, ON, OFF | ON, ON, OFF,OFF | iv>0 | iv<0 |

In case that the DC voltage difference ΔEd is a plus (ΔEd>0, i.e. Edp>Edn) and the AC current iu is a minus (iu<0) in case of outputting the possible output voltage vector V1, the voltage balance controller 39 selects the following switching state in the table 5 so as to reduce the DC voltage difference ΔEd.

TABLE 5

| Semiconductor devices | S11,S12,S13,S14 | S21,S22,S23,S24 | S31,S32,S33,S34 |
|---|---|---|---|
| Switching state | OFF,ON, ON, OFF | OFF,OFF,ON, ON | OFF,OFF,ON, ON |

In case that the DC voltage difference ΔEd is a minus (ΔEd<0, i.e. Edp<Edn) and the AC current iu is a minus (iu<0) in case of outputting the possible output voltage vector V1, the voltage balance controller 39 selects the following different switching state in the table 6 so as to balance the DC voltage difference ΔEd.

TABLE 6

| Semiconductor devices | S11,S12,S13,S14 | S21,S22,S23,S24 | S31,S32,S33,S34 |
|---|---|---|---|
| Switching state | ON, ON, OFF,OFF | OFF,ON, ON, OFF | OFF,ON, ON, OFF |

The DC voltage difference ΔEd may be controlled to be within a regular value without changing either the present output voltage vector Vo or the next intended output voltage vector Vo.

According to the tenth embodiment, since a voltage of the DC capacitor 2 may balance with a voltage of the DC capacitor 3, it may be realized to provide a controller that may prevent an excessive voltage caused by the imbalance between the voltages of the DC capacitors 2 and 3.

(Eleventh Embodiment)

Figure 21:
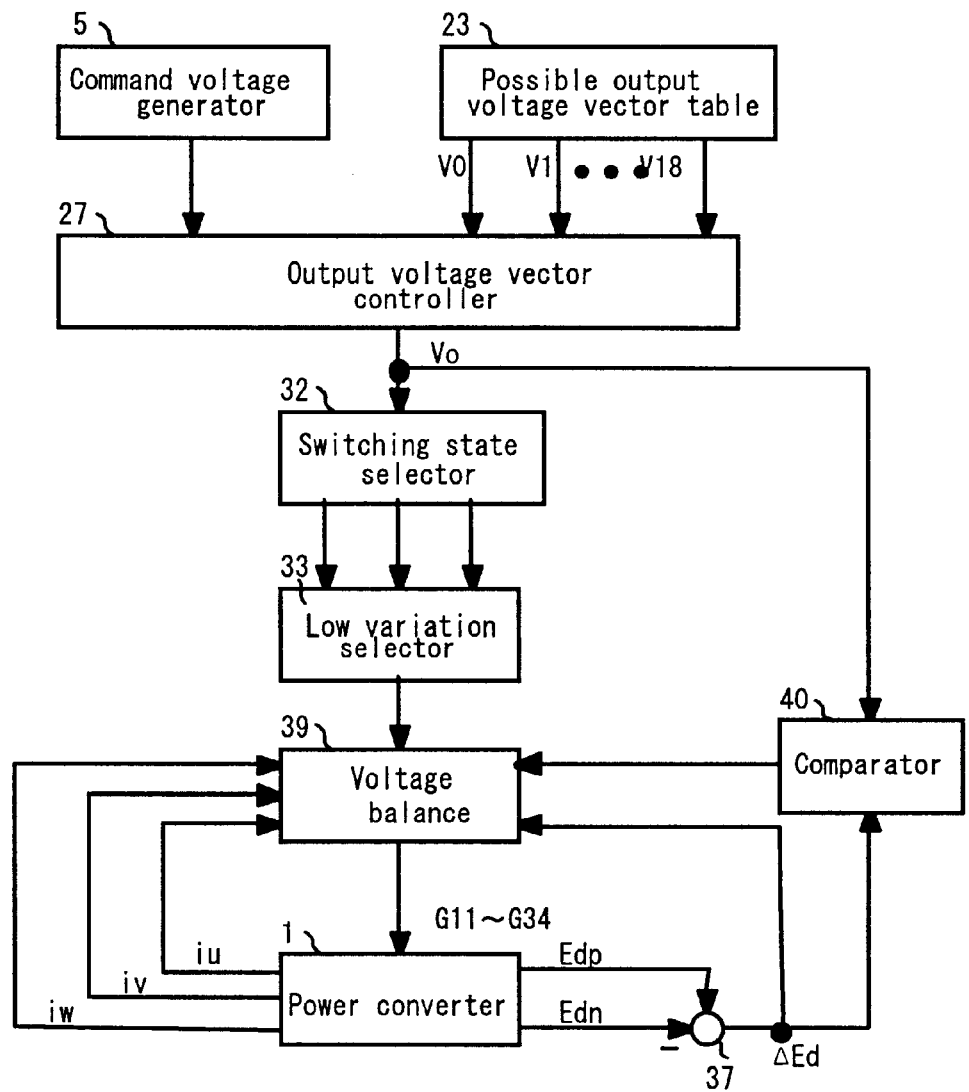
FIG. 21 is a block diagram showing a controller for a power converter of the eleventh embodiment of the present invention.

An eleventh embodiment of the present invention is hereinafter described referring to drawings. FIG. 21 is a block diagram showing a controller for a power converter of the eleventh embodiment of the present invention. A detail description of the same components as the components in FIG. 20 is omitted by appending the same numerals to the corresponding components.

A condition comparator 40 outputs a voltage balancing signal for reducing the DC voltage difference ΔEd to the voltage balance controller 39, if the DC voltage difference ΔEd from the voltage difference detector 37 exceeds a predetermined value and the output voltage vector Vo from the output voltage vector controller 27 changes.

An operation of the controller shown in FIG. 21 is hereinafter explained. The condition comparator 40 outputs a voltage balancing signal to the voltage balance controller 39, only if the DC voltage difference ΔEd exceeds a predetermined value and the output voltage vector Vo changes. If the output voltage vector Vo changes, a switching state of the ON-OFF pattern signals G11–G34 also changes. If the switching state of the ON-OFF pattern signals G11–G34 changes to reduce the DC voltage difference ΔEd at such timing, voltages of the DC capacitors 2 and 3 may be balanced with the minimum number of switching.

According to the eleventh embodiment, since a voltage of the DC capacitor 2 may balance with a voltage of the DC capacitor 3, it may be realized to provide a controller that may prevent an excessive voltage caused by the imbalance between the voltages of the DC capacitors 2 and 3.

(Twelfth Embodiment)

Figure 22:
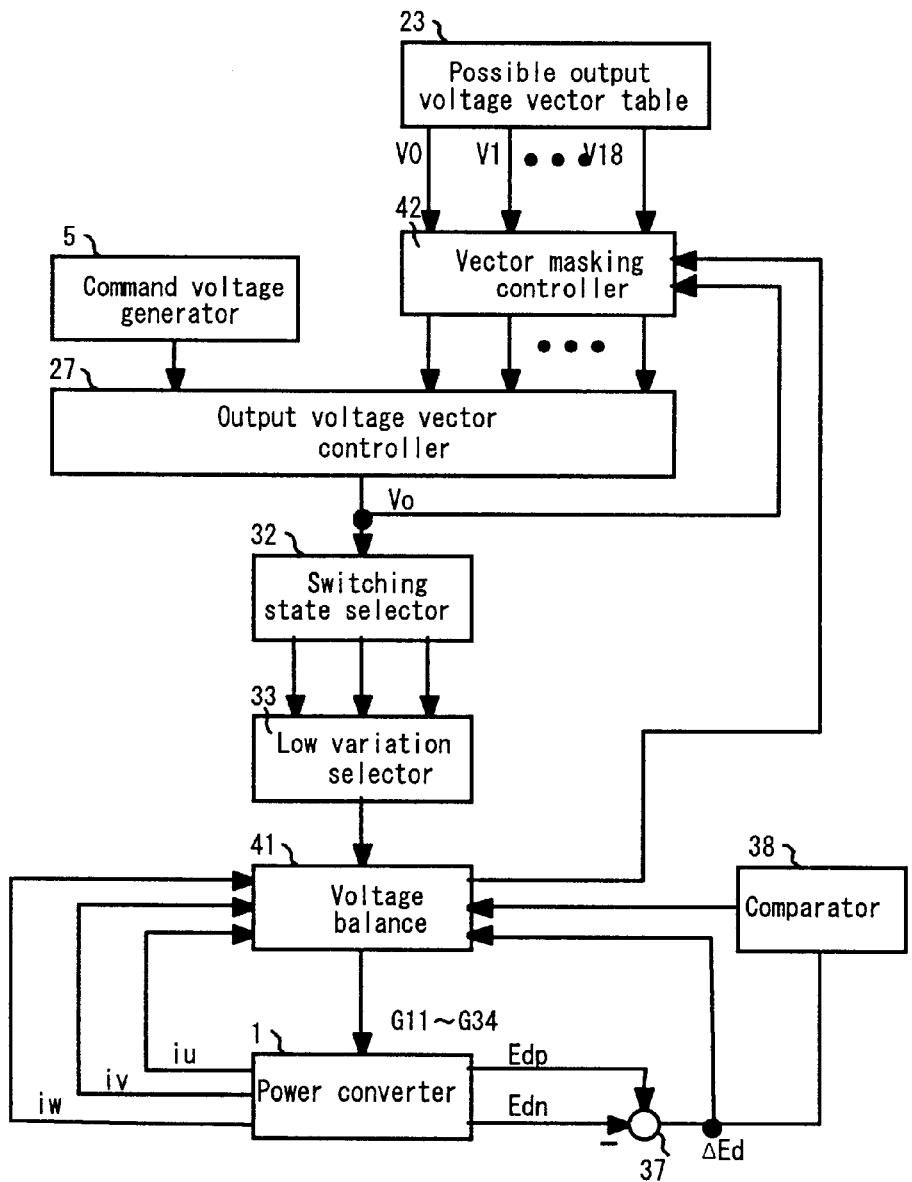
FIG. 22 is a block diagram showing a controller for a power converter of the twelfth embodiment of the present invention.

A twelfth embodiment of the present invention is hereinafter described referring to drawings. FIG. 22 is a block diagram showing a controller for a power converter of the twelfth embodiment of the present invention. A detail description of the same components as the components in FIG. 20 is omitted by appending the same numerals to the corresponding components.

A voltage balance controller 41 outputs a vector masking signal that stops a vector masking controller 42 from outputting the presently selected possible output voltage vector in case of receiving the voltage balancing signal from the condition comparator 38, if the output voltage vector controller 27 selects the possible output voltage vectors that may not reduce or maintain the DC voltage difference ΔEd.

The vector masking controller 42 prevents the presently selected possible output voltage vector from transferred to the output voltage vector controller 27 in response to the vector masking signal from the voltage balance controller 41.

An operation of the controller shown in FIG. 22 is hereinafter explained. If the output voltage vector Vo corresponds to any one of the possible output voltage vectors V0 and V13–V18, the DC voltage difference ΔEd may not vary. If the output voltage vector Vo corresponds to any one of the possible output voltage vectors V1–V6, the DC voltage difference ΔEd may be increased or decreased by changing a switching state of the ON-OFF pattern signals G11–G34. Conditions of increasing and decreasing the DC voltage difference ΔEd are shown in the following table 7 indicating a relationship of the possible output voltage vectors V7–V12 and the switching states of the semiconductor switching devices S11–S34.

culating time for selecting the output voltage vector Vo in the output voltage vector controller 27.

According to the present invention, it may be realized to provide a high efficient controller for a power converter that may minimize the number of turning ON/OFF of the semiconductor switching devices and reduce the switching losses of the semiconductor switching devices.

Further, since the output voltage vector Vo is changed to follow the command voltage vector Vr, a DC voltage is transferred to AC terminals of the converter effectively, thereby obtaining a high converting rate of voltage(high utilization factor).

Furthermore, it may be realized to provide a controller for a power converter that may prevent only specific semiconductor switching devices from heating up and from thermal breaking beforehand.

TABLE 7

| | Switching states of Semiconductor devices | | | Increase | Decrease |
|---|---|---|---|---|---|
| | S11,S12,S13,S14 | S21,S22,S23,S24 | S31,S32,S33,S34 | conditions | conditions |
| V7 | ON, ON, OFF,OFF | OFF,ON, ON, OFF | OFF,OFF,ON, ON | iv>0 | iv<0 |
| V8 | OFF,ON, ON, OFF | ON, ON, OFF,OFF | OFF,OFF,ON, ON | iu>0 | iu<0 |
| V9 | OFF,OFF,ON, ON | ON, ON, OFF,OFF | OFF,ON, ON, OFF | iw>0 | iw<0 |
| V10 | OFF,OFF,ON, ON | OFF,ON, ON, OFF | ON, ON, OFF,OFF | iv>0 | iv<0 |
| V11 | OFF,ON, ON, OFF | OFF,OFF,ON, ON | ON, ON, OFF,OFF | iu>0 | iu<0 |
| V12 | OFF,ON, ON, OFF | OFF,OFF,ON, ON | OFF,ON, ON, OFF | iw>0 | iw<0 |

As shown in the table 7, the possible output voltage vectors V7–V12 has the only one kind of switching state of the ON-OFF pattern signals G11–G34. Therefore, the DC voltage difference ΔEd may not be controlled by changing a switching state of the ON-OFF pattern signals G11–G34. Accordingly, the vector masking signal may target the only possible output voltage vectors V7–V12.

In case that the DC voltage difference ΔEd is a plus (ΔEd>0) and the AC current iv is a minus (iv<0), the voltage balance controller 41 does not output the vector masking signal to the vector masking controller 42, because the DC voltage difference ΔEd decreases. On the other hand, in case that the DC voltage difference ΔEd is a plus (ΔEd>0) and the AC current iv is a plus (iv>0), the voltage balance controller 41 outputs the vector masking signal to the vector masking controller 42, because the DC voltage difference ΔEd increases. The vector masking controller 42 prevents the presently selected possible output voltage vector V7 from transferred to the output voltage vector controller 27 in response to the vector masking signal. The output voltage vector controller 27 selects one of the possible output voltage vectors V0–V18 except for the possible output voltage vector V7.

According to the twelfth embodiment, since a voltage of the DC capacitor 2 may balance with a voltage of the DC capacitor 3, it may be realized to provide a controller that may prevent an excessive voltage caused by the imbalance between the voltages of the DC capacitors 2 and 3.

Further, the vector masking controller 42 may output some of the possible output voltage vectors V0–V18 that are adjacent to the presently selected possible output voltage vector, instead of masking the presently selected possible output voltage vector. In such case, the DC voltage difference ΔEd may be controlled to be within a regular value in the same way as the twelfth embodiment. For example, the vector masking controller 42 outputs four possible output voltage vectors V1, V2, V13 and V14 adjacent to the possible output voltage vector V7, thereby reducing a cal- Moreover, since a voltage of a positive side of DC capacitor may balance with a voltage of a negative side of DC capacitor, it may be realized to provide a controller that may prevent an excessive voltage caused by the imbalance between the voltages of the positive and negative sides of DC capacitors.

Various modifications and variations are possible in light of the above teachings. Therefore, it is to be understood that within the scope of the appended claims, the present invention may be practiced otherwise than as specifically described herein.

What is claimed is:

1. A control apparatus for a power converter having a plurality of semiconductor switching devices that converts DC power into three-phase AC power and outputs three levels of voltages, comprising:

a command voltage generator configured to output a command voltage vector that represents a voltage to be output from said power converter;

an integrator configured to calculate a difference integral vector by integrating a difference between said command voltage vector and an output voltage vector that represents a voltage command for said power converter, said output voltage vector and said command voltage vector are plotted on a plane that sets a start point of a plurality of possible output voltage vectors that said power converter may output the origin of coordinates axes;

a difference vector calculator configured to calculate difference vectors by subtracting said command voltage vector from each of said possible output voltage vectors;

a vector selector configured to select one of said possible output voltage vectors which corresponds to one of said difference vectors making the largest angle with said difference integral vector as said output voltage vector only if said difference integral vector exceeds a predetermined value; and a gate signal generator configured to determine one of switching states that includes a plurality of ON-OFF pattern signals for turning on and off said semiconductor switching devices on the basis of said output voltage vector.

2. A control apparatus for a power converter having a plurality of semiconductor switching devices that converts DC power into three-phase AC power and outputs three levels of voltages, comprising:

a command voltage generator configured to output a command voltage vector that represents a voltage to be output from said power converter;

an integrator configured to calculate a difference integral vector by integrating a difference between said command voltage vector and an output voltage vector that represents a voltage command for said power converter, said output voltage vector and said command voltage vector are plotted on a plane that sets a start point of a plurality of possible output voltage vectors that said power converter may output the origin of coordinates axes;

a possible output voltage vector selector configured to select three of said possible output voltage vectors, terminal points of said three possible output voltage vectors surround a terminal point of said command voltage vector;

a difference vector calculator configured to calculate difference vectors by subtracting said command voltage vector from each of said three possible output voltage vectors;

a vector selector configured to select one of said three possible output voltage vectors which corresponds to one of said difference vectors making the largest angle with said difference integral vector as said output voltage vector only if said difference integral vector exceeds a predetermined value; and a gate signal generator configured to determine one of switching states that includes a plurality of ON-OFF pattern signals for turning on and off said semiconductor switching devices on the basis of said output voltage vector.

3. A control apparatus for a power converter having a plurality of semiconductor switching devices that converts DC power into three-phase AC power and outputs three levels of voltages, comprising:

a command voltage generator configured to output a command voltage vector that represents a voltage to be output from said power converter;

an integrator configured to calculate a difference integral vector by integrating a difference between said command voltage vector and an output voltage vector that represents a voltage command for said power converter, said output voltage vector and said command voltage vector are plotted on a plane that sets a start point of a plurality of possible output voltage vectors that said power converter may output the origin of coordinates axes;

a possible output voltage vector selector configured to select three of said possible output voltage vectors, terminal points of said three possible output voltage vectors surround a terminal point of said command voltage vector and stand nearest said terminal point of said command voltage vector;

a difference vector calculator configured to calculate difference vectors by subtracting said command voltage vector from each of said three possible output voltage vectors;

a vector selector configured to select one of said three possible output voltage vectors which corresponds to one of said difference vectors making the largest angle with said difference integral vector as said output voltage vector only if said difference integral vector exceeds a predetermined value; and a gate signal generator configured to determine one of switching states that includes a plurality of ON-OFF pattern signals for turning on and off said semiconductor switching devices on the basis of said output voltage vector.

4. A control apparatus for a power converter having a plurality of semiconductor switching devices that converts DC power into three-phase AC power and outputs three levels of voltages, comprising:

a command voltage generator configured to output a command voltage vector that represents a voltage to be output from said power converter;

an integrator configured to calculate a difference integral vector by integrating a difference between said command voltage vector and an output voltage vector that represents a voltage command for said power converter, said output voltage vector and said command voltage vector are plotted on a plane that sets a start point of a plurality of possible output voltage vectors that said power converter may output the origin of coordinates axes;

a difference vector calculator configured to calculate difference vectors by subtracting said command voltage vector from each of said possible output voltage vectors;

a multiplication circuit configured to calculate multiplication vectors by multiplying each of said difference vectors by a constant value;

an adder configured to calculate composite vectors by adding said difference integral vector to each of said multiplication vectors;

a vector selector configured to select one of said possible output voltage vectors which corresponds to one of said difference vectors making said composite vectors smallest only if said difference integral vector exceeds a predetermined value; and a gate signal generator configured to determine one of switching states that includes a plurality of ON-OFF pattern signals for turning on and off said semiconductor switching devices on the basis of said output voltage vector.

5. A control apparatus for a power converter having a plurality of semiconductor switching devices that converts DC power into three-phase AC power and outputs three levels of voltages, comprising:

a command voltage generator configured to output a command voltage vector that represents a voltage to be output from said power converter;

an integrator configured to calculate a difference integral vector by integrating a difference between said command voltage vector and an output voltage vector that represents a voltage command for said power converter, said output voltage vector and said command voltage vector are plotted on a plane that sets a start point of a plurality of possible output voltage vectors that said power converter may output the origin of coordinates axes;

a possible output voltage vector selector configured to select three of said possible output voltage vectors, terminal points of said three possible output voltage vectors surround a terminal point of said command voltage vector;

a difference vector calculator configured to calculate difference vectors by subtracting said command voltage vector from each of said three possible output voltage vectors;

a multiplication circuit configured to calculate multiplication vectors by multiplying each of said difference vectors by a constant value;

an adder configured to calculate composite vectors by adding said difference integral vector to each of said multiplication vectors;

a vector selector configured to select one of said three possible output voltage vectors which corresponds to one of said difference vectors making said composite vectors smallest only if said difference integral vector exceeds a predetermined value; and a gate signal generator configured to determine one of switching states that includes a plurality of ON-OFF pattern signals for turning on and off said semiconductor switching devices on the basis of said output voltage vector.

6. A control apparatus for a power converter having a plurality of semiconductor switching devices that converts DC power into three-phase AC power and outputs three levels of voltages, comprising:

a command voltage generator configured to output a command voltage vector that represents a voltage to be output from said power converter;

an integrator configured to calculate a difference integral vector by integrating a difference between said command voltage vector and an output voltage vector that represents a voltage command for said power converter, said output voltage vector and said command voltage vector are plotted on a plane that sets a start point of a plurality of possible output voltage vectors that said power converter may output the origin of coordinates axes;

a possible output voltage vector selector configured to select three of said possible output voltage vectors, terminal points of said three possible output voltage vectors surround a terminal point of said command voltage vector and stand nearest said terminal point of said command voltage vector;

a difference vector calculator configured to calculate difference vectors by subtracting said command voltage vector from each of said three possible output voltage vectors;

a multiplication circuit configured to calculate multiplication vectors by multiplying each of said difference vectors by a constant value;

an adder configured to calculate composite vectors by adding said difference integral vector to each of said multiplication vectors;

a vector selector configured to select one of said three possible output voltage vectors which corresponds to one of said difference vectors making said composite vectors smallest only if said difference integral vector exceeds a predetermined value; and a gate signal generator configured to determine one of switching states that includes a plurality of ON-OFF pattern signals for turning on and off said semiconductor switching devices on the basis of said output voltage vector.

7. The control apparatus as recited in claim 1, wherein said gate signal generator selects one of said switching states that has less variation of said ON-OFF pattern signals compared to the present switching state when said output voltage vector changes.

8. The control apparatus as recited in claim 1, further comprising:

a temperature detector configured to detect temperatures of said semiconductor switching devices respectively, said gate signal generator selects one of said switching states so as to balance said temperatures of said semiconductor switching devices when three AC line voltages among said three levels of voltages of said power converter become zero.

9. The control apparatus as recited in claim 1, further comprising:

a temperature estimating circuit configured to estimate temperatures of said semiconductor switching devices on the basis of AC output currents from said power converter and said ON-OFF pattern signals, said gate signal generator selects one of said switching states so as to balance said temperatures of said semiconductor switching devices when three AC line voltages among said three levels of voltages of said power converter become zero.

10. The control apparatus as recited in claim 1, further comprising:

a voltage difference detector configured to detect a voltage difference between voltages of a positive side of capacitor and a negative side of capacitor, said positive and negative sides of capacitors are configured to smooth said DC power and said positive side of capacitor is connected between a positive electrode and a neutral point of said power converter and said negative side of capacitor is connected between said neutral point and a negative electrode of said power converter, said gate signal generator selects one of said switching states so as to reduce said voltage difference without changing either the present output voltage vector or the next intended output voltage vector when said voltage difference exceeds a predetermined value.

11. The control apparatus as recited in claim 10, wherein any one of said possible output voltage vectors having said switching state that may not reduce said voltage difference is not selected in said vector selector.

12. The control apparatus as recited in claim 1, further comprising:

a voltage difference detector configured to detect a voltage difference between voltages of a positive side of capacitor and a negative side of capacitor, said positive and negative sides of capacitors are configured to smooth said DC power and said positive side of capacitor is connected between a positive electrode and a neutral point of said power converter and said negative side of capacitor is connected between said neutral point and a negative electrode of said power converter, said gate signal generator selects one of said switching states so as to reduce said voltage difference without changing either the present output voltage vector or the next intended output voltage vector when said voltage difference exceeds a predetermined value and the present output voltage vector changes.

13. The control apparatus as recited in claim 12, wherein any one of said possible output voltage vectors having said switching state that may not reduce said voltage difference is not selected in said vector selector.

* * * * *